United States Patent
Gregg-Albers et al.

(10) Patent No.: US 11,191,289 B2
(45) Date of Patent: Dec. 7, 2021

(54) SPOONABLE SMOOTHIE AND METHODS OF PRODUCTION THEREOF

(71) Applicant: Kraft Foods Group Brands LLC, Chicago, IL (US)

(72) Inventors: Julia Lee Gregg-Albers, Glenview, IL (US); Allison M. Hibnick, Buffalo Grove, IL (US); Hayley Theodorakakos, Washington, DC (US); Hillary Sandrock, Chicago, IL (US); Sara K. Cooper, Chicago, IL (US); Andrew McPherson, Mt. Prospect, IL (US); Rachel Catherine Brown, Evanston, IL (US); Judith Gulten Moca, Palatine, IL (US); Travis Larson, Glenview, IL (US)

(73) Assignee: Kraft Foods Group Brands LLC, Chicago, IL (US)

( * ) Notice: Subject to any disclaimer, the term of this patent is extended or adjusted under 35 U.S.C. 154(b) by 155 days.

(21) Appl. No.: 16/397,887

(22) Filed: Apr. 29, 2019

(65) Prior Publication Data
US 2019/0328009 A1    Oct. 31, 2019

Related U.S. Application Data

(60) Provisional application No. 62/664,737, filed on Apr. 30, 2018.

(51) Int. Cl.
*A23L 2/02* (2006.01)
*A23L 2/66* (2006.01)
(Continued)

(52) U.S. Cl.
CPC .................. *A23L 2/02* (2013.01); *A23L 2/56* (2013.01); *A23L 2/60* (2013.01); *A23L 2/66* (2013.01);
(Continued)

(58) Field of Classification Search
CPC ...... A23L 29/231; A23L 29/256; A23L 33/15; A23L 2/56; A23L 2/60; A23L 2/66; B65B 25/001
(Continued)

(56) References Cited

U.S. PATENT DOCUMENTS

| 7,698,997 B2 | 4/2010 | Succar |
| 7,700,144 B2 | 4/2010 | Pandey |

(Continued)

FOREIGN PATENT DOCUMENTS

| CN | 102812999 | 12/2012 |
| CN | 103598333 | 2/2014 |

(Continued)

OTHER PUBLICATIONS

Healthline, "Whey Protein Isolate vs Concentrate: . . . ". 2018, https//www.healthline.com/nutrition/whey-protein-isolate-vs-concentrate, pp. 1-8. (Year: 2018).*

(Continued)

*Primary Examiner* — Helen F Heggestad
(74) *Attorney, Agent, or Firm* — Fitch, Even, Tabin & Flannery LLP

(57) ABSTRACT

Disclosed is a spoonable smoothie with fibrous, non-chalky, non-gritty texture. The spoonable smoothie has more than 34% by weight of a combination of fruit and vegetable sources, a texturant, a protein source, a vitamin source, and a mineral source. In some embodiments, the spoonable smoothie may be produced via high-pressure processing or thermal processing. In some embodiments in which high-pressure processing is employed, acid whey may be used to help obtain the non-chalky, non-gritty texture. In other embodiments in which thermal processing is employed, order of ingredients may be used to help obtain the non-chalky, non-gritty texture. In those thermally processed (Continued)

embodiments, the texturant and the protein source may be separately hydrated to control the competition for water absorption between the texturant and the protein source.

4 Claims, 10 Drawing Sheets

(51) Int. Cl.
| | | |
|---|---|---|
| *A23L 2/56* | (2006.01) | |
| *A23L 2/60* | (2006.01) | |
| *A23L 29/256* | (2016.01) | |
| *A23L 33/15* | (2016.01) | |
| *A23L 33/19* | (2016.01) | |
| *B65B 25/00* | (2006.01) | |
| *A23L 29/231* | (2016.01) | |

(52) U.S. Cl.
CPC .......... *A23L 29/231* (2016.08); *A23L 29/256* (2016.08); *A23L 33/15* (2016.08); *A23L 33/19* (2016.08); *B65B 25/001* (2013.01); *A23V 2002/00* (2013.01)

(58) Field of Classification Search
USPC ......... 426/43, 518, 519, 521, 575, 577, 599, 426/590
See application file for complete search history.

(56) References Cited

U.S. PATENT DOCUMENTS

| | | |
|---|---|---|
| 7,709,043 B2 | 5/2010 | Dong |
| RE41,537 E | 8/2010 | Chu |
| 7,799,363 B2 | 9/2010 | Sherwood |
| 7,811,620 B2 | 10/2010 | Merrill |
| 7,815,961 B2 | 10/2010 | Westhoff |
| 7,824,728 B2 | 11/2010 | Bakkene |
| 7,833,560 B2 | 11/2010 | Velissariou |
| 7,854,950 B2 | 12/2010 | Carroll |
| 7,906,165 B1 | 3/2011 | Dragt |
| 7,919,114 B2 | 4/2011 | Mower |
| 7,972,640 B2 | 7/2011 | Lee |
| 7,977,319 B1 | 7/2011 | Levine |
| 7,989,592 B2 | 8/2011 | Ganjyal |
| 8,000,314 B2 | 8/2011 | Brownrigg |
| 8,173,190 B2 | 5/2012 | Singer |
| 8,226,996 B2 | 7/2012 | Chukwu |
| 8,247,016 B2 | 8/2012 | Sugiura |
| 8,293,312 B2 | 10/2012 | Romeo |
| 8,293,313 B2 | 10/2012 | Vaslin |
| 8,309,155 B2 | 11/2012 | Kubo |
| 8,425,968 B2 | 4/2013 | Smith |
| 8,455,031 B2 | 6/2013 | Graumlich |
| 8,486,470 B2 | 7/2013 | Laukli |
| 8,501,263 B2 | 8/2013 | Koponen |
| 8,551,544 B2 | 10/2013 | Borders |
| 8,623,443 B2 | 1/2014 | Kamiya |
| 8,623,445 B2 | 1/2014 | Tang |
| 8,647,689 B2 | 2/2014 | Vanhemelrijck |
| 8,673,382 B2 | 3/2014 | Jordan |
| 8,715,758 B2 | 5/2014 | Pannell |
| 8,747,936 B2 | 6/2014 | Ferriss |
| 8,795,749 B2 | 8/2014 | Benjamin |
| 8,808,774 B2 | 8/2014 | Falkenberg |
| 8,815,324 B2 | 8/2014 | Patterson |
| 8,820,225 B2 | 9/2014 | Milla |
| 8,821,956 B2 | 9/2014 | Giuseppin |
| 8,932,651 B2 | 1/2015 | Lax |
| 8,945,659 B2 | 2/2015 | Almeida Rivera |
| 8,956,676 B2 | 2/2015 | Hansen |
| 8,962,056 B2 | 2/2015 | Succar |
| 8,987,229 B2 | 3/2015 | Boulat |
| 8,993,023 B2 | 3/2015 | Legan |
| 8,993,030 B2 | 3/2015 | Aldred |
| 8,999,416 B2 | 4/2015 | Berndt Briceno |
| 8,999,422 B2 | 4/2015 | Wenger |
| 9,005,685 B2 | 4/2015 | Cotton |
| 9,011,959 B2 | 4/2015 | Schweizer |
| 9,049,883 B2 | 6/2015 | Koenig |
| 9,067,773 B2 | 6/2015 | Graham |
| 9,155,323 B2 | 10/2015 | Rozenszain |
| 9,198,458 B2 | 12/2015 | Bertone |
| 9,216,191 B2 | 12/2015 | Adden |
| 9,247,767 B2 | 2/2016 | Hathuc |
| 9,259,018 B2 | 2/2016 | De Sadeleer |
| 9,277,763 B2 | 3/2016 | Beckman |
| 9,295,712 B2 | 3/2016 | Huebner-Keese |
| 9,414,614 B2 | 8/2016 | Delle Coste |
| 9,427,007 B2 | 8/2016 | Mason |
| 9,480,274 B2 | 11/2016 | Tang |
| 9,516,893 B2 | 12/2016 | Gibson |
| 9,526,270 B2 | 12/2016 | Balder |
| 9,585,410 B2 | 3/2017 | Doleyres |
| 9,599,407 B2 | 3/2017 | Deane |
| 9,615,593 B2 | 4/2017 | Simunovic |
| 9,622,503 B2 | 4/2017 | Popp |
| 9,622,506 B2 | 4/2017 | Stone |
| 9,661,873 B2 | 5/2017 | Wang |
| 9,668,494 B2 | 6/2017 | Santos |
| 9,675,100 B2 | 6/2017 | Bennett |
| 2002/0012719 A1 | 1/2002 | Nadland |
| 2008/0299253 A1 | 12/2008 | Rabault |
| 2009/0074912 A1 | 3/2009 | Avramis |
| 2010/0004344 A1 | 1/2010 | Dallas |
| 2010/0015296 A1 | 1/2010 | Meyer |
| 2010/0034948 A1 | 2/2010 | Ross |
| 2010/0034951 A1 | 2/2010 | Schweizer |
| 2010/0055279 A1 | 3/2010 | Dubbelman |
| 2010/0056449 A1 | 3/2010 | Brown |
| 2010/0062133 A1 | 3/2010 | Colova |
| 2010/0112134 A1 | 5/2010 | Chukwu |
| 2010/0119662 A1 | 5/2010 | Horlacher |
| 2010/0129510 A1 | 5/2010 | Mulder |
| 2010/0136168 A1 | 6/2010 | McHaney |
| 2010/0159082 A1 | 6/2010 | Rupasinghe |
| 2010/0159112 A1 | 6/2010 | Madsen |
| 2010/0189857 A1 | 7/2010 | Blijdenstein |
| 2010/0189860 A1 | 7/2010 | Tay |
| 2010/0196557 A1 | 8/2010 | Sugiura |
| 2010/0196576 A1 | 8/2010 | Traina |
| 2010/0203206 A1 | 8/2010 | Hayata |
| 2010/0203217 A1 | 8/2010 | Nair |
| 2010/0221396 A1 | 9/2010 | Rogers |
| 2010/0278971 A1 | 11/2010 | Song |
| 2010/0278984 A1 | 11/2010 | Ervin |
| 2010/0322904 A1 | 12/2010 | Scholtens |
| 2011/0003030 A1 | 1/2011 | Nielsen |
| 2011/0008515 A1 | 1/2011 | Peterson |
| 2011/0023728 A1 | 2/2011 | Deane |
| 2011/0027449 A1 | 2/2011 | Madsen |
| 2011/0059207 A1 | 3/2011 | Niness |
| 2011/0059217 A1 | 3/2011 | Meyer |
| 2011/0070336 A1 | 3/2011 | Mutilangi |
| 2011/0081455 A1 | 4/2011 | Kamarei |
| 2011/0086158 A1 | 4/2011 | Aremu |
| 2011/0104350 A1 | 5/2011 | Cluesserath |
| 2011/0135791 A1* | 6/2011 | Yang et al. |
| 2011/0143008 A1 | 6/2011 | Mattie |
| 2011/0143009 A1 | 6/2011 | Tuason |
| 2011/0159157 A1 | 6/2011 | De Rocco |
| 2011/0159165 A1 | 6/2011 | Nair |
| 2011/0200733 A1 | 8/2011 | Ashkenazi |
| 2011/0217416 A1 | 9/2011 | Christensen |
| 2011/0236545 A1 | 9/2011 | Brown |
| 2011/0250314 A1 | 10/2011 | Lager, II |
| 2011/0262595 A1 | 10/2011 | Lee |
| 2011/0262618 A1 | 10/2011 | Melwitz |
| 2011/0278153 A1 | 11/2011 | Bates |
| 2011/0305740 A1 | 12/2011 | Boursier |
| 2011/0311599 A1 | 12/2011 | Boursier |
| 2011/0311696 A1 | 12/2011 | Catelli |
| 2012/0021107 A1 | 1/2012 | Knowlton |
| 2012/0034345 A1 | 2/2012 | Gauthier |

(56) References Cited

U.S. PATENT DOCUMENTS

| | | |
|---|---|---|
| 2012/0035263 A1 | 2/2012 | Giuseppin |
| 2012/0076913 A1 | 3/2012 | Murdza |
| 2012/0095190 A1 | 4/2012 | Deak |
| 2012/0103831 A1 | 5/2012 | Schrive |
| 2012/0114625 A1 | 5/2012 | Wiessel |
| 2012/0114798 A1 | 5/2012 | Zobrist |
| 2012/0121763 A1 | 5/2012 | Hurwitz |
| 2012/0135125 A1 | 5/2012 | Muschiolik |
| 2012/0196021 A1 | 8/2012 | Anand |
| 2012/0328757 A1 | 12/2012 | Mulder |
| 2013/0004648 A1 | 1/2013 | Taillan |
| 2013/0052313 A1 | 2/2013 | Lamikanra |
| 2013/0059059 A1 | 3/2013 | Tristram |
| 2013/0084370 A1 | 4/2013 | Zacharias |
| 2013/0123374 A1 | 5/2013 | Gusek |
| 2013/0129867 A1 | 5/2013 | Deak |
| 2013/0129879 A1 | 5/2013 | White |
| 2013/0129881 A1 | 5/2013 | Reuscher |
| 2013/0142909 A1 | 6/2013 | Klingenberg |
| 2013/0142917 A1 | 6/2013 | Sepehr |
| 2013/0156893 A1 | 6/2013 | Han |
| 2013/0165626 A1 | 6/2013 | Fukuoka |
| 2013/0171318 A1 | 7/2013 | Bovetto |
| 2013/0189399 A1 | 7/2013 | Ragnarsson |
| 2013/0196029 A1 | 8/2013 | Saito |
| 2013/0196044 A1 | 8/2013 | Winston |
| 2013/0216678 A1 | 8/2013 | Horlacher |
| 2013/0220146 A1 | 8/2013 | Bertocchi |
| 2013/0224335 A1 | 8/2013 | Corredig |
| 2013/0253171 A1 | 9/2013 | Green |
| 2013/0259973 A1 | 10/2013 | Valdez |
| 2013/0269377 A1 | 10/2013 | Bertone |
| 2013/0280392 A1 | 10/2013 | Semenza |
| 2013/0281669 A1 | 10/2013 | Giuseppin |
| 2013/0309355 A1 | 11/2013 | Wang-Chen |
| 2013/0323380 A1 | 12/2013 | Kellens |
| 2013/0330444 A1 | 12/2013 | Barbosa Senra Lopes |
| 2014/0065264 A1 | 3/2014 | Do |
| 2014/0087025 A1 | 3/2014 | Linsenmeier |
| 2014/0106035 A1 | 4/2014 | Zajac |
| 2014/0134316 A1 | 5/2014 | Jincks |
| 2014/0141127 A1 | 5/2014 | Jincks |
| 2014/0142285 A1 | 5/2014 | Germain |
| 2014/0154385 A1 | 6/2014 | Hamill |
| 2014/0154387 A1 | 6/2014 | Almblad |
| 2014/0161930 A1 | 6/2014 | Savant |
| 2014/0170262 A1 | 6/2014 | Heidebach |
| 2014/0178554 A1 | 6/2014 | Bohn |
| 2014/0205722 A1 | 7/2014 | Quintanar Guerrero |
| 2014/0220198 A1 | 8/2014 | Konuklar |
| 2014/0228550 A1 | 8/2014 | Hruschka |
| 2014/0242253 A1 | 8/2014 | Holtzapple |
| 2014/0287054 A1 | 9/2014 | Mathisen |
| 2014/0295030 A1 | 10/2014 | Downes |
| 2014/0308374 A1 | 10/2014 | Goel |
| 2014/0308424 A1 | 10/2014 | Bai |
| 2014/0342062 A1 | 11/2014 | Murdza |
| 2014/0343259 A1 | 11/2014 | Bleyer |
| 2014/0377420 A1 | 12/2014 | Berndt Briceño |
| 2014/0377443 A1 | 12/2014 | Tanzosh |
| 2015/0010683 A1 | 1/2015 | Wu |
| 2015/0024098 A1 | 1/2015 | Pheterson |
| 2015/0038459 A1 | 2/2015 | Bacarella |
| 2015/0050400 A1 | 2/2015 | Timmermans |
| 2015/0050413 A1 | 2/2015 | Sepcic |
| 2015/0079199 A1 | 3/2015 | Ivie |
| 2015/0079235 A1 | 3/2015 | Wright |
| 2015/0079262 A1 | 3/2015 | Spratt |
| 2015/0090252 A1 | 4/2015 | Barbeau |
| 2015/0110948 A1 | 4/2015 | Schweizer |
| 2015/0118371 A1 | 4/2015 | Velasco |
| 2015/0126441 A1 | 5/2015 | Berry |
| 2015/0140177 A1 | 5/2015 | Kang |
| 2015/0147456 A1 | 5/2015 | Dazo |
| 2015/0150296 A1 | 6/2015 | Cugnasca |
| 2015/0164105 A1 | 6/2015 | Peskin |
| 2015/0173406 A1 | 6/2015 | Lila |
| 2015/0189902 A1 | 7/2015 | Silva Paes |
| 2015/0201640 A1 | 7/2015 | Beindorff |
| 2015/0237878 A1* | 8/2015 | Kusumaatmaja |
| 2015/0237885 A1 | 8/2015 | Boursier |
| 2015/0250204 A1 | 9/2015 | Bassi |
| 2015/0272151 A1 | 10/2015 | Narahara |
| 2015/0272181 A1 | 10/2015 | Spano |
| 2015/0320061 A1 | 11/2015 | Warin |
| 2015/0320093 A1 | 11/2015 | Tokuda |
| 2015/0351442 A1 | 12/2015 | Zhu |
| 2015/0366248 A1 | 12/2015 | Yang |
| 2015/0374012 A1 | 12/2015 | Klamczynska |
| 2016/0000103 A1 | 1/2016 | Oestengaard |
| 2016/0016991 A1 | 1/2016 | Green |
| 2016/0044939 A1 | 2/2016 | Capodieci |
| 2016/0050964 A1 | 2/2016 | Milburn |
| 2016/0073650 A1 | 3/2016 | Wiessel |
| 2016/0100613 A1 | 4/2016 | Whalen |
| 2016/0113318 A1 | 4/2016 | Innings |
| 2016/0157513 A1 | 6/2016 | Kohut |
| 2016/0174599 A1 | 6/2016 | Lahtinen |
| 2016/0192670 A1 | 7/2016 | Peterson |
| 2016/0213048 A1 | 7/2016 | Blase |
| 2016/0235104 A1 | 8/2016 | Stinson |
| 2016/0235107 A1 | 8/2016 | Hrdinova |
| 2016/0249651 A1 | 9/2016 | Whalen |
| 2016/0249670 A1 | 9/2016 | Singh Baines |
| 2016/0262412 A1 | 9/2016 | Pedersen |
| 2016/0295880 A1 | 10/2016 | Edara |
| 2016/0303226 A1 | 10/2016 | Mercenier |
| 2016/0309743 A1 | 10/2016 | Spinelli |
| 2016/0309745 A1 | 10/2016 | Spinelli |
| 2016/0316785 A1 | 11/2016 | Bourgeois |
| 2016/0316810 A1 | 11/2016 | Terp |
| 2016/0324173 A1 | 11/2016 | Rojas Graü |
| 2016/0324174 A1 | 11/2016 | Rojas Graü |
| 2016/0324202 A1 | 11/2016 | Griego |
| 2016/0332128 A1 | 11/2016 | Abraham |
| 2016/0345602 A1 | 12/2016 | Delle Coste |
| 2016/0353782 A1 | 12/2016 | Ruppman, Sr. |
| 2016/0353784 A1 | 12/2016 | Maru |
| 2016/0353787 A1 | 12/2016 | Mitchell |
| 2016/0366920 A1 | 12/2016 | Tanzosh |
| 2016/0374370 A1 | 12/2016 | Galaffu |
| 2016/0374385 A1 | 12/2016 | Bertocchi |
| 2017/0000148 A1 | 1/2017 | Das |
| 2017/0009264 A1 | 1/2017 | Balder |
| 2017/0014445 A1 | 1/2017 | Livney |
| 2017/0020948 A1 | 1/2017 | Tripp |
| 2017/0027168 A1 | 2/2017 | Heath |
| 2017/0027193 A1 | 2/2017 | Diermeier |
| 2017/0042199 A1 | 2/2017 | Stjernberg |
| 2017/0055550 A1 | 3/2017 | Brijwani |
| 2017/0064973 A1 | 3/2017 | Da Silva |
| 2017/0064983 A1 | 3/2017 | Nazaroff |
| 2017/0071229 A1 | 3/2017 | Bernett |
| 2017/0099852 A1 | 4/2017 | Nono |
| 2017/0112159 A1 | 4/2017 | Grimaldi |
| 2017/0150734 A1 | 6/2017 | Lorand |
| 2017/0156350 A1 | 6/2017 | Van Seeventer |
| 2017/0156374 A1 | 6/2017 | Ackilli |
| 2017/0181459 A1 | 6/2017 | Harvey |
| 2017/0196237 A1 | 7/2017 | Wegst |
| 2017/0196243 A1 | 7/2017 | Baxter |
| 2017/0202248 A1 | 7/2017 | White |
| 2017/0223993 A1 | 8/2017 | Plummer |
| 2017/0238580 A1 | 8/2017 | Knight |
| 2017/0245529 A1 | 8/2017 | Terp |
| 2017/0251689 A1 | 9/2017 | Grebenkämper |
| 2017/0251690 A1 | 9/2017 | Bezemer |
| 2017/0251696 A1 | 9/2017 | Simons |
| 2017/0265508 A1 | 9/2017 | Roy |
| 2017/0311638 A1 | 11/2017 | McGregor |
| 2017/0318828 A1 | 11/2017 | Jensen |

(56) References Cited

U.S. PATENT DOCUMENTS

| | | |
|---|---|---|
| 2017/0347676 A1 | 12/2017 | Lau |
| 2018/0055082 A1 | 3/2018 | Nair |

FOREIGN PATENT DOCUMENTS

| | | | |
|---|---|---|---|
| CN | 104381449 | | 3/2015 |
| CN | 105916383 | * | 8/2016 |
| CN | 106900850 | | 6/2017 |
| WO | WO 0195742 | * | 12/2001 |
| WO | 2012072760 | | 6/2012 |
| WO | 2015001943 | | 1/2015 |
| WO | 2015004521 | | 1/2015 |
| WO | 2015014742 | | 2/2015 |
| WO | 2015022411 | | 2/2015 |
| WO | 2015046279 | | 4/2015 |
| WO | 2015069678 | | 5/2015 |
| WO | 2015093992 | | 6/2015 |
| WO | 2015098930 | | 7/2015 |
| WO | 2015126350 | | 8/2015 |
| WO | 2015146880 | | 10/2015 |
| WO | 2015167413 | | 11/2015 |
| WO | 2015168083 | | 11/2015 |
| WO | 2015168113 | | 11/2015 |
| WO | 2015168119 | | 11/2015 |
| WO | 2015186021 | | 12/2015 |
| WO | 2015197078 | | 12/2015 |
| WO | 2016007789 | | 1/2016 |
| WO | 2016026194 | | 2/2016 |
| WO | 2016036717 | | 3/2016 |
| WO | 2016051190 | | 4/2016 |
| WO | 2016057818 | | 4/2016 |
| WO | 2016083495 | | 6/2016 |
| WO | 2016092768 | | 6/2016 |
| WO | 2016110803 | | 7/2016 |
| WO | 2016112745 | | 7/2016 |
| WO | 2016126182 | | 8/2016 |
| WO | 2016129998 | | 8/2016 |
| WO | 2016130507 | | 8/2016 |
| WO | 2016133448 | | 8/2016 |
| WO | 2016134142 | | 8/2016 |
| WO | 2016136658 | | 9/2016 |
| WO | 2016139159 | | 9/2016 |
| WO | 2016142788 | | 9/2016 |
| WO | 2016168630 | | 10/2016 |
| WO | 2016172418 | | 10/2016 |
| WO | 2016195953 | | 12/2016 |
| WO | 2016198567 | | 12/2016 |
| WO | 2016202830 | | 12/2016 |
| WO | 2017018917 | | 2/2017 |
| WO | 2017019752 | | 2/2017 |
| WO | 2017024183 | | 2/2017 |
| WO | 2017039706 | | 3/2017 |
| WO | 2017044966 | | 3/2017 |
| WO | 2017059488 | | 4/2017 |
| WO | 2017064172 | | 4/2017 |
| WO | 2017081305 | | 5/2017 |
| WO | 2017086784 | | 5/2017 |
| WO | 2017097607 | | 6/2017 |
| WO | 2017103282 | | 6/2017 |
| WO | 2017124106 | | 7/2017 |
| WO | 2017126959 | | 7/2017 |
| WO | 2017140439 | | 8/2017 |
| WO | 2017146250 | | 8/2017 |
| WO | 2017151948 | | 9/2017 |

OTHER PUBLICATIONS

Diva, Monica Reinagel, "How to Make the Perfect Smoothie", pp. 1-10, www.quickanddirtytips.com/health-fitness, pp. 1-10. (Year: 2010).*

McKay, Alan M. et al., "A comparative study of changes in the microbiota of apple juice treated by high hydrostatic pressure (HHP) or high pressure homogenisation (HPH)", Food MicroBiology, vol. 28, Issue 8, published Dec. 2011, pp. 1426-1431.

Uchida, Rafael, et al., "Alicyclobacillus acidoterrestris spore inactivation by high pressure combined with mild heat: Modeling the effects of temperature and soluble solids", Food Control, vol. 73, Part B, published Mar. 2017, pp. 426-432.

Aday, Mehmet Seckin et al., "An innovative technique for extending shelf life of strawberry: Ultrasound", LWT—Food Science and Technology, vol. 52, Issue 2, published Jul. 2013, pp. 93-101.

Gialleli, Angelika-Ioanna et al., "Apple juice preservation through microbial adsorption by nano/micro-tubular cellulose", Innovative Food Science and Emerging Technologies, vol. 33, published Feb. 2016, pp. 416-421.

Maresca, Paola et al., "Application of a multi-pass high-pressure homogenization treatment for the pasteurization of fruit juices", Journal of Food Engineering, vol. 4, Issue 3, published Jun. 2011, pp. 364-372.

Simunek, Marina et al., "Aroma Profile and Sensory Properties of Ultrasound-Treated Apple Juice and Nectar", Food Technology and Biotechnology, vol. 51, published Jan. 2013, pp. 101-111.

Mena, Pedro et al., "Combinatory Effect of Thermal Treatment and Blending on the Quality of Pomegranate Juices" Food and Bioprocess Technology, vol. 6, published Nov. 2013, pp. 3186-3199.

Patrignani, Francesca et al., "Combined effects of high pressure homogenization treatment and citral on microbiological quality of apricot juice", International Journal of Food Microbiology, vol. 160, Issue 3, published Jan. 2013, pp. 273-281.

Timmermans, R.A.H et al., "Comparing equivalent thermal, high pressure and pulsed electric field processes for mild pasteurization of orange juice. Part I: Impact on overall quality attributes", Innovative Food Science and Emerging Technologies, vol. 12, Issue 3, published Jul. 2011, pp. 235-243.

Vervoort, Liesbeth, et al., "Comparing equivalent thermal, high pressure and pulsed electric field processes for mild pasteurization of orange juice Part II: Impact on specific chemical and biochemical quality parameters", Food Science and Emerging Technologies, vol. 12, Issue 4, published Oct. 2011, pp. 466-477.

Benlloch-Tinoco, María et al., "Comparison of microwaves and conventional thermal treatment on enzymes activity and antioxidant capacity of kiwifruit puree", Innovative Food Science and Emerging Technologies, vol. 19, published Jul. 2013, pp. 166-172.

Agcam, E. et al., "Comparison of phenolic compounds of orange juice processed by pulsed electric fields (PEF) and conventional thermal pasteurisation", Food Chemistry, vol. 143, published Jan. 2014, pp. 354-361.

Jo, Cheorun et al., "Comparison of the efficacy of gamma and UV irradiation insanitization of fresh carrot juice", Radiation Physics and Chemistry, vol. 81, Issue 8, published Aug. 2012, pp. 1079-1081.

Riganakos, Kyriakos A. et al., "Comparison of UV-C and thermal treatments for the preservation of carrot juice", Innovative Food Science and Emerging Technologies, vol. 42, published Aug. 2017, pp. 165-172.

Santhirasegaram, Vicknesha et al., "Comparison of UV-C treatment and thermalpasteurization on quality of Chokanan mango (*Mangifera indica* L.) juice", Food and Bioproducts Processing, vol. 94, published Apr. 2015, pp. 313-321.

Saldaña, G. et al., "Defining treatment conditions for pulsed electric field pasteurization of apple juice" International Journal of Food Microbiology, vol. 151, Issue 1, published Nov. 2011, pp. 29-35.

Santiago, Jihan Santanina J. et al., "Deliberate processing of carrot purées entails tailored serum pectin structures" Innovative Food Science and Emerging Technologies, vol. 33, published Feb. 2016, pp. 515-523.

Shiby, Varghese Kochupurakkal et al., "Development of whey-fruit-based energy drink mixes using D-optimal mixture design", International Journal of Food Science & Technology, vol. 48, published Apr. 2013, pp. 742-748.

Timmermans, R.A.H. et al., "Effect of electrical field strength applied by PEF processing and storage temperature on the outgrowth of yeasts and moulds naturally present in a fresh fruit smoothie", International Journal of Food Microbiology, vol. 230, published Aug. 2016, pp. 21-30.

(56) References Cited

OTHER PUBLICATIONS

Dubrovic, Igor et al., "Effect of High Intensity Ultrasound and Pasteurization on Anthocyanin Content in Strawberry Juice", Food Technology and Biotechnology, vol. 49, published Apr. 2011, pp. 196-204.

Liao, Hongmei et al., "Effect of high pressure CO2 and mild heat processing on natural microorganisms in apple juice", International Journal of Food Microbiology, vol. 137, Issue 1, published Jan. 2010, pp. 81-87.

Kubo, Mirian Tiaki Kaneiwa et al., Effect of high pressure homogenization (HPH) on the physical stability of tomato juice, Food Research International, vol. 51, Issue 1, published Apr. 2013, pp. 170-179.

Augusto, Pedro E.D. et al., "Effect of high pressure homogenization (HPH) on the rheological properties of a fruit juice serum model" Journal of Food Engineering, vol. 111, Issue 2, published Jul. 2012, pp. 474-477.

Khandpur, Paramjeet et al., "Effect of novel ultrasound based processing on the nutrition quality of different fruit and vegetable juices", Ultrasonics Sonochemistry, vol. 27, published Nov. 2015, pp. 125-136.

Paquet, Émilie et al., "Effect of processing treatments and storage conditions on stability of fruit juice based beverages enriched with dietary fibers alone and in mixture with xanthan gum" LWT—Food Science and Technology, vol. 55, Issue 1, published Jan. 2014, pp. 131-138.

Palgan, I. et al., "Effectiveness of High Intensity Light Pulses (HILP) treatments for the control of *Escherichia coli* and Listeria innocua in apple juice, orange juice and milk" Food Microbiology, vol. 28, Issue 1, published Feb. 2011, pp. 14-20.

Hounhouigan, Menouwesso H. et al., "Effect of Processing on the Quality of Pineapple Juice", Food Reviews International, vol. 30, published Apr. 2014, pp. 112-133.

Huang, Peng et al., "Impact of High Hydrostatic Pressure Processing on Fruit Flesh Quality of Fruit Containing Carrot Juice", International Proceedings of Chemical, Biological and Environmental Engineering, vol. 95, published Aug. 2016, pp. 68-74.

Aneja, Kamal Rai et al., "Emerging Preservation Techniques for Controlling Spoilage and Pathogenic Microorganisms in Fruit Juices", International Journal of Microbiology, published Sep. 2014, pp. 1-14.

Hanson, A.L. et al., "Evaluation of increased vitamin D fortification in high-temperature, short-time-processed 2% milk, UHT-processed 2% fat chocolate milk, and low-fat strawberry yogurt" American Dairy Science Association, vol. 93, Issue 2,published Feb. 2010, 801-807.

Keenan, Derek F. et al., "Evaluation of thermal and high hydrostatic pressure processed apple purees enriched with prebiotic inclusions", Innovative Food Sciences and Emerging Technologies, vol. 12, Issue 3, published Jul. 2011, pp. 261-268.

Del Buono, Amanda, "Functional, clean label trends drive growth of vegetable juices, juice smoothies", Dairy Foods, published online May 11, 2017, 5 pages.

Clark, Peter J. "Functionality Effects of Nonthermal Processes on Foods", Food Technology, published Jan. 2011, pp. 77-81.

Guerrero-Beltran, Jose A. et al., "High hydrostatic pressure effect on *Saccharomyces cerevisiae, Escherichia coli* and listeria innocua in pear nectar", Journal of Food Quality, vol. 34, Issue 6, published November, 201, pp. 371-378.

He, Zhiyong et al., "High pressure homogenization processing, thermal treatment and milk matrix affect in vitro bioaccessibility of phenolics in apple, grape and orange juice to different extents", Food Chemistry, vol. 200, Jun. 2016, pp. 107-116.

Sulaiman, Alifdalino et al., "High pressure processing, thermal processing and freezing of 'Camarosa' strawberry for the inactivation of polyphenoloxidase and control of browning", Food Control, vol. 33, Issue 2, Oct. 2013, pp. 424-428.

Sevenich, Robert et al., "High-Pressure Thermal Sterilization: Food Safety and Food Quality of Baby Food Puree", Journal of Food Science, vol. 79, No. 2, published Feb. 2014, pp. M230-M237.

Betoret, E. et al., "Homogenization pressures applied to citrus juice manufacturing. Functional properties and application", Journal of Food Engineering, vol. 111, Issue 1, published Jul. 2012, pp. 28-33.

Grimi, Nabil et al., "Impact of apple processing modes on extracted juice quality: Pressing assisted by pulsed electric fields", Journal of Food Engineering, vol. 103, Issue 1, published Mar. 2011, pp. 52-61.

Morales-de la Pena, M. et al., "Impact of high intensity pulsed electric field on antioxidant properties and quality parameters of a fruit juice-soymilk beverage in chilled storage", LWT—Food Science and Technology, vol. 43, Issue 6, published Jul. 2010, pp. 872-881.

Koskiniemi, Craig B. et al., "Improvement of heating uniformity in packaged acidified vegetables pasteurized with a 915 MHz continuous microwave system", Journal of Food Engineering, vol. 105, Issue 1, published Jul. 2011, pp. 149-160.

Christiaens, Stefanie et al., "In situ pectin engineering as a tool to tailor the consistency and syneresis of carrot purée", Food Chemistry, vol. 33, Issue 1, published Jul. 2012, pp. 146-155.

Lou, Fangfei et al., "Inactivation of a Human Norovirus Surrogate by High-Pressure Processing: Effectiveness, Mechanism, and Potential Application in the Fresh Produce Industry", Applied and Environmental Microbiology, vol. 77, Issue 5, published Mar. 2011, pp. 1862-1871.

Deng, Hui Li, Le et al., "Inactivation, morphology, interior structure and enzymatic activity of high pressure CO2-treated *Saccharomyces cerevisiae*", Innovative Food Science and Emerging Technologies, vol. 14, published Apr. 2012, pp. 99-106.

Christiaens, Stefanie et al., "Influence of processing on the pectin structure-function relationship in broccoli purée", Innovative Food Science and Emerging Technologies, vol. 15, published Jul. 2012, pp. 57-65.

Best, Dean, "Kellog invests in US smoothie maker Bright Greens", Just-Food, published online Jun. 15, 2017, 1 page.

Balasubramaniam, V.M. et al., "Kinder, Gentler Food Processing", Food Technology, vol. 70, Issue 12, published Dec. 2016, pp. 20-28.

Peng, Jing et al., "Kinetics of carrot texture degradation under pasteurization conditions" Journal of Food Engineering, vol. 122, published Feb. 2014, pp. 84-91.

Kebede, Biniam et al., "Kinetics of Strecker aldehyde formation during thermal and high pressure high temperature processing of carrot puree", Innovative Food Science and Emerging Technologies, vol. 39, published Feb. 2017, pp. 88-93.

Gabriel, Alonzo A., "Microbial inactivation in cloudy apple juice by multi-frequency Dynashock power ultrasound", Ultrasonics Sonochemistry, vol. 19, Issue 2, published Mar. 2012, pp. 346-351.

"Mixed fortunes for the drinkable yogurt market", New Hope Network, published online Jan. 14, 2016.

Jafari, Seid Mahdi et al., "Nano-fluid thermal processing of watermelon juice in a shell and tube heat exchangerand evaluating its qualitative properties", Innovative Food Science and Emerging Technologies, vol. 42, published Aug. 2017, pp. 173-179.

Guignon, Bérengére et al., "Orange juice pvT-properties for high pressure processing and modeling purposes: Importance of soluble solids concentration", Food Research International, vol. 46, Issue 1, published Apr. 2012, pp. 83-91.

Achir, Nawel et al., "Pasteurization of citrus juices with ohmic heating to preserve the carotenoid profile", Innovative Food Science and Emerging Technologies, vol. 33, published Feb. 2016, pp. 397-404.

Rojas, Meliza Lindsay et al., "Peach juice processed by the ultrasound technology: Changes in its microstructure improve its physical properties and stability", Food Research International, vol. 82, published Apr. 2016, pp. 22-33.

Mcnamee, C., et al., "PEF based hurdle strategy to control Pichia fermentans, Listeria innocua and *Escherichia coli* k12 in orange juice", International Journal of Food Mircobiology, vol. 138, Issues 1-2, published Mar. 2010, pp. 13-18.

Soazo, Marina et al., "Prefreezing application of whey protein-based edible coating to maintain quality attributes of strawberries", International Journal of Food Science and Technology, vol. 50, published 2015, pp. 605-611.

(56) References Cited

OTHER PUBLICATIONS

Altuntas, Julide et al., "Processing of peach nectar by pulsed electric fields with respect to physical and chemical properties and microbial inactivation", Journal of Food Process Engineering, vol. 34, Published 2011, pp. 1506-1522.
Wehring, Oily, "Product Launch—UK: The Coca-Cola Co's Innocent Super Smoothies", Just-Drinks, published online Mar. 10, 2014, 2 pages.
Timmermans, R.A.H., et al., "Pulsed electric field processing of different fruit juices: Impact of pH and temperature on inactivation of spoilage and pathogenic micro-organisms" International Journal of Food Microbiology, vol. 34, published Mar. 2014, pp. 105-111.
Qiu, Shanshan et al., "Qualification and quantisation of processed strawberry juice based on electronic nose and tongue", LWT—Food Science and Technology, vol. 60, Issue 1, published Jan. 2015, pp. 115-123.
Xu, Zhenzhen et al., "Quality assurance in pepper and orange juice blend treated by high pressure processing and high temperature short time" Innovative Food Science and Emerging Technologies vol. 31, published Oct. 2015, pp. 28-36.
Yi, Junjie et al., "Quality change during high pressure processing and thermal processing of cloudy apple juice", LWT—Food Science and Technology, vol. 75, published Jan. 2017, pp. 85-92.
Zhang, Yan et al., "Quality comparison of carrot juices processed by high-pressure processing and high-temperature short-time processing", Innovative Food Science and Emerging Technologies, vol. 33, published Feb. 2016, pp. 135-144.
Mayer, Marina, "Retail Beverages Promote Energy in a Healthy Way", Refrigerated &Frozen Foods, published online, Jul. 8, 2014, 4 pages.
Walkling-Ribeiro, Markus et al., "Shelf life and sensory attributes of a fruit smoothie-type beverage processed with moderate heat and pulsed electric fields", LWT—Food Science and Technology, vol. 43, Issue published Sep. 2010, pp. 1067-1073.
Janzantti, Natalia S., et al., "Shelflife of Fresh and Pasteurized Organic Passion Fruit (*Passiflora edulis* F. *flavicarpa* Deg.) Pulp", Journal of Food Processing and Preservation, vol. 38, published Jul. 2012, pp. 262-270.
Fabroni, Simona et al., "Supercritical carbon dioxide-treated blood orange juice as a new product in the fresh fruit juice market", Innovative Food Science and Emerging Technologies, vol. 11, Issue 3, pp. 477-484.
Puvanenthiran, Amirtha et al., "Synergistic effect of milk solids and carrot cell wall particles on the rheology and texture of yoghurt gels", Food Research International, vol. 62, published Aug. 2014, pp. 701-708.
Bliss, Rosalie Marion, "Taking Purees to a New Level", United States Department of Agriculture Reseach Magazine, vol. 62, No. 2, published 2014, 2 pages.
Samapundo, S. et al., "The combined effect of pasteurization intensity, water activity, pH and incubation temperature on the survival and outgrowth of spores of Bacillus cereus and Bacillus pumilus in artificial media and food products", International Journal of Food Microbiology, vol. 181, published Jul. 2014, pp. 10-18.
Najgebauer-Lejko, Dorota et al., "The Effect of Addition of Selected Vegetables on the Microbiological, Textural, and Flavour Profile Properties of Yoghurts", Acta Scientiarum Polonorum Technologia Alimentaria, vol. 14, published 2015, pp. 45-53.
Ertugay, Mustafa Fatih et al., "The effect of ultrasonic treatments on cloudy quality-related quality parameters in apple juice", Innovative Food Science and Emerging Technologies, vol. 26, published Dec. 2014, pp. 226-231.
Leite, Thiago Soares et al., "The use of high pressure homogenization (HPH) to reduce consistency of concentrated orange juice (COJ)" Innovative Food Science and Emerging Technologies, vol. 26, published Dec. 2014, pp. 124-133.
Vervoort, Liesbeth et al., "Thermal versus high pressure processing of carrots: A comparative pilot-scale study on equivalent basis" Innovative Food Science and Emerging Technologies vol. 15, published Jul. 2012, pp. 1-13.

Jin, Tony Z., et al., "Upscaling from benchtop processing to industrial scale production: More factors to be considered for pulsed electric field food processing", Jounral of Food Engineering, vol. 146, published Feb. 2015, pp. 72-80.
Islam, Md Shajedul et al., "UV-C irradiation as an alternative disinfection technique: Study of its effect on polyphenols and antioxidant activity of apple juice" Innovative Food Science and Emerging Technologies, vol. 34, published Apr. 2016, pp. 344-351.
Geveke, David J. et al., "Validation of a pulsed electric field process to pasteurize strawberry purée", Journal of Food Engineering, vol. 166, Dec. 2015, pp. 384-389.
Uysal Pala, Cigdem et al., "Effects of UV-C Light Processing on Some Quality Characteristics of Grape Juices" Food and Bioprocess Technology. vol. 6, published Mar. 2012, Abstract only, 1 page.
Yi, Junjie et al., "Comparing the Impact of High-Pressure Processing and Thermal Processing on Quality of "Hayward" and "Jintao" Kiwifruit Puree: Untargeted Headspace Fingerprinting and Targeted Approaches", Food Bioprocess Technology, vol. 9, Issue 12, published 2016, pp. 2059-2069.
"New Refrigerated & Frozen Beverages", Refrigerated and Frozen Foods, published online May 16, 2014, 2 pages.
Formica, Carolina et al., "A Functional Smoothie from Carrots with Induced Enhanced Phenolic Content", Food Bioprocess Technology, vol. 10, published Nov. 2016, pp. 1-12, Abstract only (1 page).
"Kurz notiert", Lebensmittel Zeitung, Issue 20, p. 0036, published May 2014, Abstract only (1 page).
"New Product Showcase," Checkout | Brand News TOP 100 Brands 2016, published Aug. 2016, 1 page.
"New products," Publican's Morning Advertiser, published online May 2015, 2 pages.
"Plant to Plate", Prepared Foods, vol. 183 Issue 2, published Feb. 2014, pp. 25-26, Abstract only (1 page).
Ardestani, Samira Berenji et al., "Effect of extraction and processing conditions on organic acids of barberry fruits", Journal of Food Biochemistry, vol. 39, Issue 5, published Jun. 2015, Abstract only (2 pages).
Camiro-Cabrera, Mariana et al., "High hydrostatic pressure and temperature applied to preserve the antioxidant compounds of mango pulp (*Magnifera indica* I.)", Food and Bioprocess Technology, vol. 10, No. 4, pp. 639-649, Abstract only (1 page).
Chen, Chen et al., "Effects of pulsed electric field on collidal properties and storage stability of carrot juice" International Journal of Food Science & Technology, vol. 47, pp. 2079-2085, Abstract only (1 page).
Cioletti, Jeff, "From Almonds to Oats to Owls", Beverage World, vol. 133, Issue 3, published Mar. 2014, p. 6, Abstract only (1 page).
Cullen, P.J. et al., "Ozone Processing for Food Preservation: An Overview on Fruit Juice Treatments", The Journal of the International Ozone Association, vol. 32, Issue 3, published 2010, pp. 166-179, Abstract only (1 page).
Cusic-Waite, Joy G. et al., "Inactivation of pathogenic bacteria by fd&c red No. 3 and high-pressure processing combination treatment in food systems", Journal of Food Safety, vol. 31, Issue 4, published Oct. 2011, Abstract only, (2 pages).
Decker, Kimberly J., "Texturants are dairy's X factor", Dairy Foods, published Jan. 2014, 4 pages.
Gong, Yi, et al., "Comparative Study of the Microbial Stability and Quality of Carrot Juice Treated by High-Pressure Processing Combined with Mild Temperature and Conventional Heat Treatment", Journal of Food Process Engineering, vol. 38, Issue 4, published Nov. 2014, Abstract only (2 pages).
Henriquez, C. et al., "Development of an ingredient contianing applie peel, as a source of polyphenols and dietary fiber" Journal of Food Science, vol. 75, published Aug. 2010, Abstract only (1 page).
Hirsch, Angelica R. et al., "Impact of minimal heat-processing on pectin methylesterase and peroxidase activity in freshly squeezed Citrus juices" European Food Research & Technology, vol. 232, No. 1, published 2011, pp. 71-81, Abstract only (1 page).
Jabbar, Saqib et al., "Influence of sonication and high hydrostatic pressure on the quality of carrot juice", International Journal of Food Science & Technology, vol. 49, Issue 11, published Jun. 2014, Abstract only (1 page).

(56) References Cited

OTHER PUBLICATIONS

Knorr, Dietrich, "High-pressure thermal sterilization lessens process contaminants in baby food purees", Emerging Food R&D Report, published Aug. 2015, 3 pages.

Lasekan, Ola et al., "Effect of pulsed electric field processing on flavor and color of liquid foods", vol. 41, Issue 3, published Aug. 2016, Abstract only (2 pages).

Leadley et al., "Validating 'new' technologies," Food and Drink Technology, published May 2014, 3 pages.

Lopez-Sanchez P. et al., "Rheology and Microstructure of Carrot and Tomato Emulsions as a Result of High-Pressure Homogenization Conditions", Journal of Food Science, vol. 76, published Jan. 2011, Abstract only (1 page).

Moelants, Katlijn R.N. et al., "The Effects of Process-Induced Pectin Changes on the Viscosity of Carrot and Tomato Sera", Food and Bioprocess Technology, vol. 6, No. 10, published 2013, pp. 2870-2883, Abstract only (1 page).

Ortega-Rivas, E. et al., "Nonthermal Food Processing Alternatives and Their Effects on Taste and Flavor Compounds of Beverages", Critical Reviews in Food Science and Nutrition, vol. 54, Issue 2, published 2014, pp. 190-207, Abstract only, (1 page).

Ortega-Rivas, Enrique, "Critical issues pertaining to application of pulsed electric fields in microbial control and quality of processed fruit juices", Food and Bioprocess Technology, vol. 4, published May 2009, pp. 631-646, Abstract only (1 page).

Patrignani, F. et al., "Potentialities of High-Pressure Homogenization to Inactivate Zygosaccharomyces bailii in Fruit Juices", Journal of Food Science, vol. 75, Issue 2, published Mar. 2010, Abstract only (1 page).

Ratphitagsanti, W. et al., "Efficacy of pressure-assisted thermal processing, in combination with organic acids, against Bacillus amyloliquefaciens spores suspended in deionized water and carrot puree", Journal of Food Science, vol. 75, Published Jan. 2010, pp. M46-M52, Abstract only (1 page).

Santhirasegaram, Vicknesha et al., Effects of Thermal and Nonthermal Processing on Phenolic Compounds, Antioxidant Activity and Sensory Attributes of Chokanan Mango (*Mangifera indica* L.) Juice, vol. 8, Issue 11, published Nov. 2015, pp. 2256-2267, Abstract only (1 page).

Sulaiman, A. et al., "Quality stability and sensory attributes of apple juice processed by thermosonication, pulsed electric field and thermal processing", vol. 23, published Apr. 2017, pp. 265-276, Abstract only ( 1 page).

Valencia-Chamorro, SA et al.,"Antimicrobial edible films and coatings for fresh and minimally processed fruits and vegetables: a review", Critical Review Food Science Nutrition, vol. 51, published Oct. 2011, pp. 872-900, Abstract only (1 page).

Yuk, Hyun Gyun et al., "Nonthermal Processing of Orange Juice Using a Pilot-Plant Scale Supercritical Carbon Dioxide System with a Gas-Liquid Metal Contactor", Journal of Food Processing and Preservation, vol. 38, No. 1, published 2014, p. 630, Abstract only (1 page).

\* cited by examiner

SPOONABLE SMOOTHIE AND METHODS OF PRODUCTION THEREOF

CROSS-REFERENCE TO RELATED APPLICATIONS

This application claims the benefit of U.S. Provisional Application No. 62/664,737, filed on Apr. 30, 2018.

FIELD

This application relates generally to foods and beverages, and more particularly to packaged food and beverage products suitable for large-scale manufacture and distribution, for retail sale to consumers.

BACKGROUND

Numerous food products combine fruits, berries and/or other plant-based ingredients with yogurt and/or other dairy components to provide desirable nutritional properties, including fortification, in combination with desired flavor profiles, textural characteristics and other organoleptic properties. Maintaining desired properties of products such as smoothies over a refrigerated shelf life suitable for large-scale distribution and sale to consumers at retail outlets can be challenging. Flavor profiles of smoothies containing ingredients such as fresh fruits and berries can degrade rapidly over time due to oxidation and/or other factors. High pressure processing (HPP), thermal treatments, and/or various preservatives can be helpful with some issues, but there is a need for improvement in this area, particularly where it is desired to avoid or minimize use of artificial preservatives or other artificial ingredients.

One challenge of producing a stable smoothie with one or more proteinaceous ingredients is that difficulties may be encountered in obtaining an acceptable texture. Another challenge is that exposure to ultraviolet (UV) light over the course of a product's shelf life can have deleterious effects on certain properties, e.g., color and stability. A further challenge is that addition of vitamins and minerals to enhance nutritional properties can result in undesirable effects on organoleptic properties.

SUMMARY

In some embodiments, a spoonable smoothie includes between about 34% and about 45% by weight of a combination of fruit and vegetable sources, along with a texturant, a protein source, a vitamin source, and a mineral source. In some such embodiments, a fibrous, non-chalky, non-gritty texture is achieved using a whey protein isolate or an acid whey as a protein source. In some embodiments, the spoonable smoothie may be produced via high-pressure processing or thermal processing. In some embodiments in which high-pressure processing is employed, acid whey may be used to help obtain the non-chalky, non-gritty texture. In some embodiments in which thermal processing is employed, the order of ingredient addition may help obtain the non-chalky, non-gritty texture.

In one method of producing a spoonable smoothie, a protein source is hydrated to form a first mixture. In one aspect of the current disclosure, a mineral source may also be added to the first mixture. A pectin, an amount of sweetener, and other texturants are separately hydrated to form a second mixture. The method may further include separately shearing at least one fruit source and at least one vegetable source. The second mixture, the sheared fruit source, and the vegetable source may be cold mixed and sheared together to form a third mixture. The method may further include adding color and flavor to the third mixture. The first mixture may be then added to the third mixture and cold mixed and sheared together to form a final mixture. The method may include heating the final mixture in a first heat exchanger, then cooling the final mixture in a second heat exchanger. The method may also include cold filling the final mixture into a package and sealing the package.

Another method of producing a spoonable smoothie may include preparing a hot mix that includes a pectin, a sugar, and an amount of hot water. The method may also include preparing a first cold mix that includes at least one fruit source, at least one vegetable source, and a yogurt. The method may further include preparing a second cold mix that includes a whey protein source and an amount of cold water. A final mixture may be formed by cold mixing and shearing together the hot mix, the first cold mix, and the second cold mix. The method may include packing the final mixture into a package, then submitting the package to high-pressure processing.

DETAILED DESCRIPTION

Figure 1:
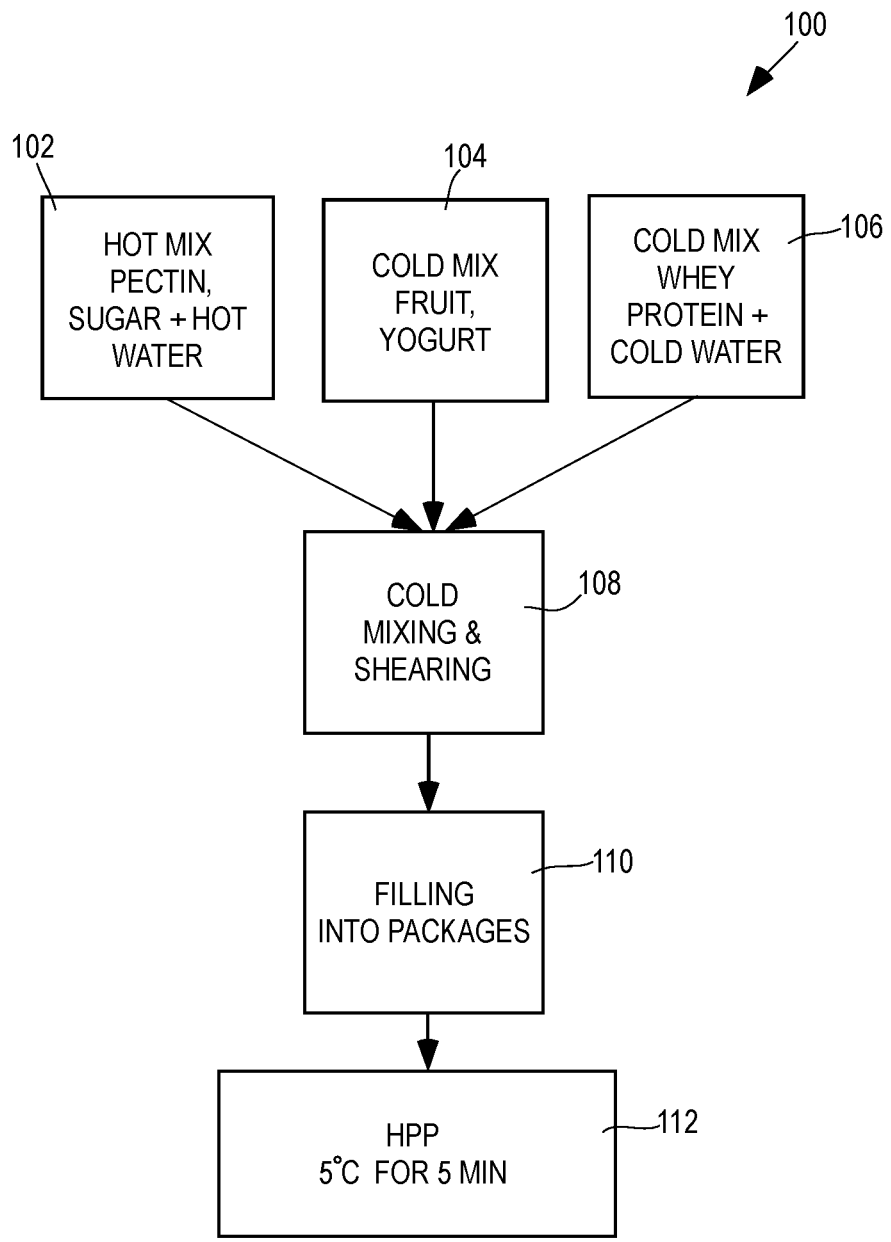
FIG. 1 is a block flow diagram for an exemplary process for the production of a spoonable smoothie using high-pressure processing.

Described herein is a smoothie with a fibrous, non-gritty, non-chalky, spoonable texture. The spoonable smoothie has a high concentration of fruits and vegetables. In some embodiments, the combination of fruit and vegetable sources is more than 20%, more than 30%, more than 32%, more than 34%, more than 35%, more than 36%, more than 38%, more than 40%, or between 34% and 45% of the total weight of the spoonable smoothie. In some embodiments, the fruit sources may include, but are not limited to, apple, avocado, apricot, blueberry, blackberry, banana, blood orange, boysenberry, clementine, cherry, cantaloupe, coconut, cranberry, cucumber, currant, date, dragonfruit, elderberry, fig, goji berry, gooseberry, guava, grapefruit, grape, green pepper, honeydew, juniper berry, kiwi, kumquat, lemon, lime, lychee, mango, mulberry, nectarine, olive, orange, pineapple, passion fruit, papaya, pomegranate, pear, plum, peach, persimmon, pluot, pomelo, pumpkin, raspberry, strawberry, tamarind, tomato, watermelon, yuzu, or a combination thereof. Some fruits may be considered vegetables. In some embodiments, the vegetable sources may include, but are not limited to, artichoke, asparagus, eggplant, alfalfa sprouts, bean sprouts, black beans, chick peas, green beans, kidney beans, lentils soy beans, peas, broccoli, broccoflower, cauliflower, brussels sprouts, cabbage, carrot, celery, kale, spinach, bok choy, chard, collard greens, mustard greens, lettuce, arugula, onions, peppers, rhubarb, beets, ginger, parsnips, rutabaga, turnips, radishes, sweetcorn, squash, potato, sweet potato, yam, zucchini, or a combination thereof. Some vegetables may be considered fruits. The fruit and vegetable sources may be in the form of puree, puree concentrate, puree single strength, individual quick frozen (IQF), fresh, frozen, fresh frozen, canned, dried, freeze-dried, dehydrated, juice, milk, oil, natural coloring, natural flavoring, or combinations thereof.

In some forms, the spoonable smoothie may also include texturants, such as pectin, rice flour, tapioca flour, locust bean gum, iota carrageenan gum, other starches, or a combination thereof. Some texturants may also be considered a source of fiber. In some embodiments, the pectin may include high methoxyl pectin, low methoxyl pectin, or the like. In some aspects of the present disclosure, texturants may also include high cellulose gum, cellulose gel, guar gum, gellan gum, or a combination thereof. In one aspect of the present disclosure, pectin LM12 may be used. In some embodiments, the total amount of texturants may be in an amount of 1.0% to 3.1%, 2.0% to 3.1%, 2.3% to 3.1%, 2.4% to 3.1%, 2.6% to 3.1%, or 2.8% to 3.1% of the total weight of the spoonable smoothie. In some forms, the pectin may be in an amount of 0.20% to 0.35% or 0.25% to 0.30% of the total weight of the spoonable smoothie. In some embodiments, rice flour may be in an amount of 1.0% to 2.0%, 1.25% to 1.75%, or 1.50% to 1.75% of the total weight of the spoonable smoothie. In some embodiments, tapioca flour may be in an amount of 0.2% to 1.2%, 0.4% to 1.0%, 0.5% to 1.0%, or 0.70% to 1.0% of the total weight of the spoonable smoothie. In some embodiments, locust bean gum may be in an amount of 0.05% to 0.15%, 0.08% to 0.13%, or 0.10% to 0.13% of the total weight of the spoonable smoothie.

Some embodiments may also include a protein source, such as acid whey, whey protein isolate, soy, pea protein, or combinations thereof. In some embodiments, the amount of the protein source may be in an amount of 0.5% to 2.5%, 1.0% to 2.0%, 1.0% to 1.5%, or 1.1% to 1.3% of the total weight of the spoonable smoothie. Some forms of the spoonable smoothie may also include a dairy component, such as a yogurt. In some embodiments, the yogurt may be Greek, Skyr or Icelandic, Australian, Balkan-style, Swiss-style, Labneh, Lassi, Kefir, whole milk, reduced-fat, nonfat, unstrained, cow's milk, goat's milk, sheep's milk, soy, rice, almond, coconut, or a combination thereof. In some embodiments, the yogurt may also be considered a protein source. In some embodiments, the dairy component is between 15% and 25%, between 16% and 25%, between 17% and 25%, between 18% and 25%, between 18% and 23%, or between 18% and 21%.

Some embodiments of the spoonable smoothie may also include a vitamin source, such vitamin A, vitamin B1 (thiamine), vitamin B2 (riboflavin), Vitamin B3 (niacin), Vitamin B5 (pantothenic acid), Vitamin B6 (pyridoxine), Vitamin B7 (biotin) Vitamin B9 (folic acid), vitamin B12 (cobalamin), Vitamin C, ascorbic acid, Vitamin D, Vitamin E, Vitamin K, or a combination thereof. In some forms, the vitamin source may be in an amount of 0.0004% to 0.025% of the total weight of the spoonable smoothie. Some embodiments may include a mineral source, such as iron, phosphorous, folate, potassium, magnesium, calcium, selenium, sodium, zinc, or a combination thereof. In some forms, the mineral source may be in an amount of 0.2% to 0.4%, 0.25% to 0.35%, or about 0.345%. Some embodiments of the spoonable smoothie may also include preservatives.

Specific flavors for the spoonable smoothie may include but are not limited to, e.g., triple berry-beet, strawberry-banana-rhubarb, mango-pineapple-banana-carrot, coconut-pineapple-banana-squash, green apple-kiwi-kale, raspberry-peach, blueberry-apple, and harvest berry. Ranges of product formulas that may be used in some embodiments are provided below in Table 1.

TABLE 1

| Ingredient | Amount (%) |
| --- | --- |
| Fruit and vegetable sources | 34-45 |
| Dairy Component | 18-22 |
| Protein Source | 1-3 |
| Sugar | 2.5-7 |
| Texturants | 2-4 |
| Color | 0-3 |
| Flavor | 0-3 |
| Vitamin | 0-3 |
| Mineral | 0-3 |
| Water | 20-40 |
| Preservatives | 0-1 |

One challenge of producing a spoonable smoothie is the effect of UV light exposure on the color, organoleptic properties, and nutritional value, all of which affect the shelf life of the spoonable smoothie. For example, when exposed to light for extended periods, such as in a refrigerated dairy display case in a grocery store, one or more protein components or other components may degrade and/or break down. Protein degradation may result in a change in color, texture, or taste of the spoonable smoothie. Oxidation of unsaturated fatty acids may be associated with off-flavors and/or loss of nutrients. This oxidation may occur rapidly under exposure to high intensity light, or over a longer period of time under exposure to less intense fluorescent lighting. Light may also affect nutritional ingredients such as vitamins and minerals in the spoonable smoothie. For example, riboflavin (Vitamin B2) can be destroyed by ultraviolet light. To combat detrimental effects of light exposure, the package containing the spoonable smoothie may be opaque or may be surrounded by a non-transparent label. A translucent/transparent package may be more attractive to a potential customer, and can provide a benefit by enabling potential purchasers to view the contents, but may allow the spoonable smoothie to be more susceptible to light exposure. In some embodiments, the sides of the package may be covered by a non-transparent label, but the bottom of the package may be transparent. In some embodiments, a light blocking barrier may be employed to reduce deleterious effects of light exposure. Increasing amounts of one or more fruit and/or vegetable components while decreasing amounts of one or more sources of protein and/or unsaturated fatty acids (e.g., by decreasing amounts of dairy components) in the spoonable smoothie composition may reduce deleterious effects of light exposure. Further, employing a low-fat or no-fat dairy source or yogurt or an oxygen barrier may help reduce or prevent issues with off notes detected as a result of the oxidation.

Another challenge of producing a smoothie with a fibrous, non-chalky, spoonable texture is avoiding protein coagulation or sedimentation that may cause grittiness. In some embodiments, the order of ingredients added may help prevent protein precipitation, coagulation, or sedimentation. For example, it is believed that whey protein isolate and pectin may directly compete for water absorption, and that if the whey protein isolate absorbs too much water, then the resulting texture of the smoothie may be grainy. If the pectin absorbs too much water, then the resulting texture of the smoothie may be gel-like. Adding the pectin and the whey protein isolate at the same time may impair the functionality of one or both of the pectin and the whey protein isolate. However, it is believed that when a non-processed form of whey, such as acid whey, replaces the whey protein isolate in the same amounts, the grainy or gel-like texture may be avoided. In some embodiments, whey protein isolate and pectin may be hydrated separately to ensure that each ingredient only absorbs the desired amount of water to create the unique, fibrous, non-gritty, non-chalky, spoonable texture. Additional embodiments to help prevent protein sedimentation or coagulation may include the presence of buffering salts to increase pH, the replacement of pectin with iota carrageenan gum (as seen in the use of almond milk), and the addition of muriatic acid to lower the pH below 2.

After the spoonable smoothie is produced, high-pressure processing (HPP) or a thermal process may be employed to inactivate spoilage organisms and/or to otherwise increase stability. In some embodiments, HPP may occur for about 4 to 6 minutes, or specifically about 5 minutes, at a pressure of between 58 k Psi and 87 k Psi, between 63 k Psi and 87 k Psi, between 68 k Psi and 87 k Psi, between 73 k Psi and 87 k Psi, between 78 k Psi and 87 k Psi, between 80 k Psi and 87 k Psi, or about 86 k Psi and at a temperature of about 0° C. to about 10° C., or specifically at about 5° C. In some embodiments, thermal processing may be completed in a tube-in-tube heat exchanger, shell-and-tube heat exchanger, plate heat exchanger, scraped-surface heat exchanger, or other apparatus. In some embodiments, the thermal processing may occur at about 160° F. to 180° F., or at about 170° F., for about 20 to 40 seconds, or specifically about 30 seconds. Any of the processes may be carried out in a manner that hinders or prevents denaturing or precipitation of proteins. The hindrance or prevention of protein coagulation may ultimately prevent the release of free water from the matrix, which may help maintain the unique, homogenous, fibrous texture of the spoonable smoothie. This texture may be somewhere between that of a full-fat dairy yogurt and a full fat, high-protein Greek yogurt. This texture may be spoonable, non-chalky, non-gritty, and/or fibrous, may have a water activity greater than about 0.85 and a degree of Brix of 13 to 24, about 14 to about 18, or about 14.5.

In some embodiments of the spoonable smoothie produced using HPP, further adjustments may be made to ensure the desired consistency of a smoothie with a fibrous, non-gritty, spoonable texture. For example, when HPP is employed to inactivate spoilage organisms, the resulting embodiment may not have the desired viscosity, mouth feel, and firmness. However, the use of acid whey rather than whey protein isolate as a protein source may help improve the viscosity to the fibrous, non-gritty, spoonable texture. In other aspects of producing a spoonable smoothie using HPP, an increased amount of iota carrageenan may also improve the viscosity of the spoonable smoothie. In yet other embodiments, the use of homogenized yogurt may also improve the viscosity of the spoonable smoothie.

FIG. 1 shows a method 100 of producing a spoonable smoothie using high-pressure processing. The method 100 includes preparing a hot mixture 102 from an amount of pectin, an amount of sugar, and an amount of hot water to hydrate the pectin. The hot water may be at a temperature of between 90° F. and 120° F., between 95° F. and 110° F., or about 100° F. In some embodiments with gums, such as iota carrageenan, the gums may also be added to the hot mixture to avoid fish eyes (i.e., undesirable clumping of the gum). The addition of sugar in the pectin/water mixture may help disperse the pectin at a later step. The method 100 also includes separately preparing a first cold mixture 104 from a fruit source, a vegetable source, and a yogurt. The method 100 further includes preparing a second cold mixture 106 from a whey protein source, such as acid whey, and an amount of cold water to hydrate the whey protein source. The method 100 includes combining, cold mixing, and shearing 108 the hot mixture and both cold mixtures together to form a final mixture. The method 100 includes filling 110 the final mixture into packages. The method 100 further includes processing 112 the packages through high-pressure processing to inactivate microorganisms.

Another method of producing a spoonable smoothie shows a first mixture created from an amount of protein source and an amount of water to hydrate the protein source. Separately, a second mixture is created from an amount of pectin and an amount of water to hydrate the pectin. Vegetable and fruit sources are sheared together to form a third mixture. The first, second, and third mixtures are cold mixed and sheared together with an amount of sweetener, an amount of yogurt, and an amount of a texturant to a final mixture. Any natural colors or flavors may also be added. The final mixture is heated in a first heat exchanger, transferred to a hold tube, then cooled in a second heat exchanger. The final mixture is then cold filled into a package, which is then sealed. In some embodiments, the final mixture may be ambient filled into the package.

Figure 2:
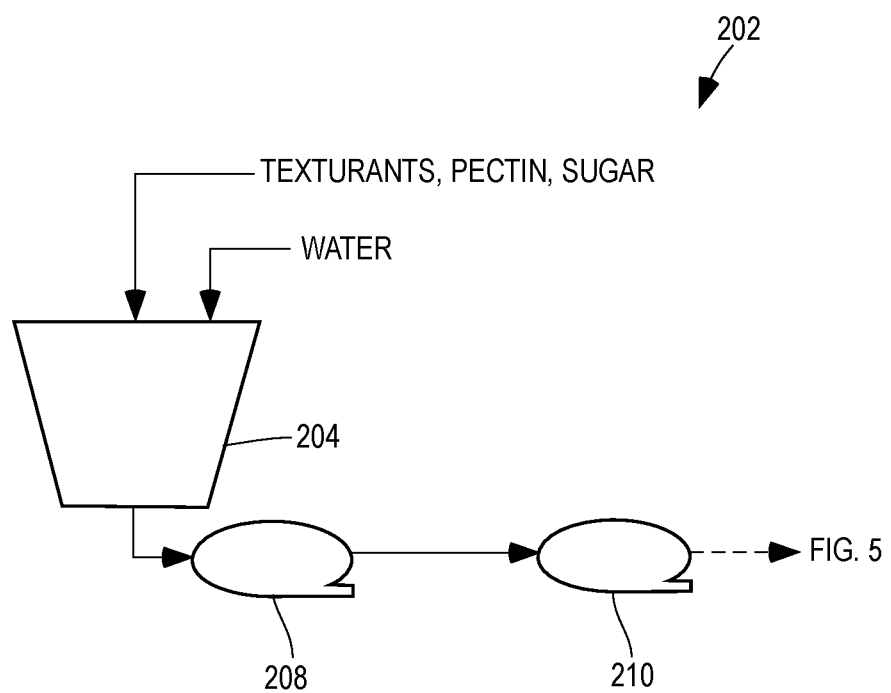
FIG. 2 is a block flow diagram of an exemplary process for separately hydrating the texturants for the production of a spoonable smoothie using thermal processing.

FIGS. 2-5 show an exemplary method 200 of the production of a spoonable smoothie. FIG. 2 shows a process 202 for separately hydrating pectin. The texturants and pectin may be pre-blended in their dry states with about 50% of the sugar using a ribbon blender. About 75% of the total water required may be added to a high shear mixer 204, such as a Breddo mixer. The pre-blended texturant/sugar mixture may be metered into the high shear mixer 204 over a period of about 10 to about 30 minutes. The resulting texturant/sugar slurry may be mixed for a minimum of about 10 additional minutes from the time of the last powder addition. The texturant/sugar slurry may be directly added to a batch tank/high shear mixer 206. A pump 208, such as a Likiwifier pump, and a shear pump 210, such as a Silverson or a Dispax, may help transfer the texturant/sugar slurry between the mixer 204 and the batch tank/high shear mixer 206.

Figure 3:
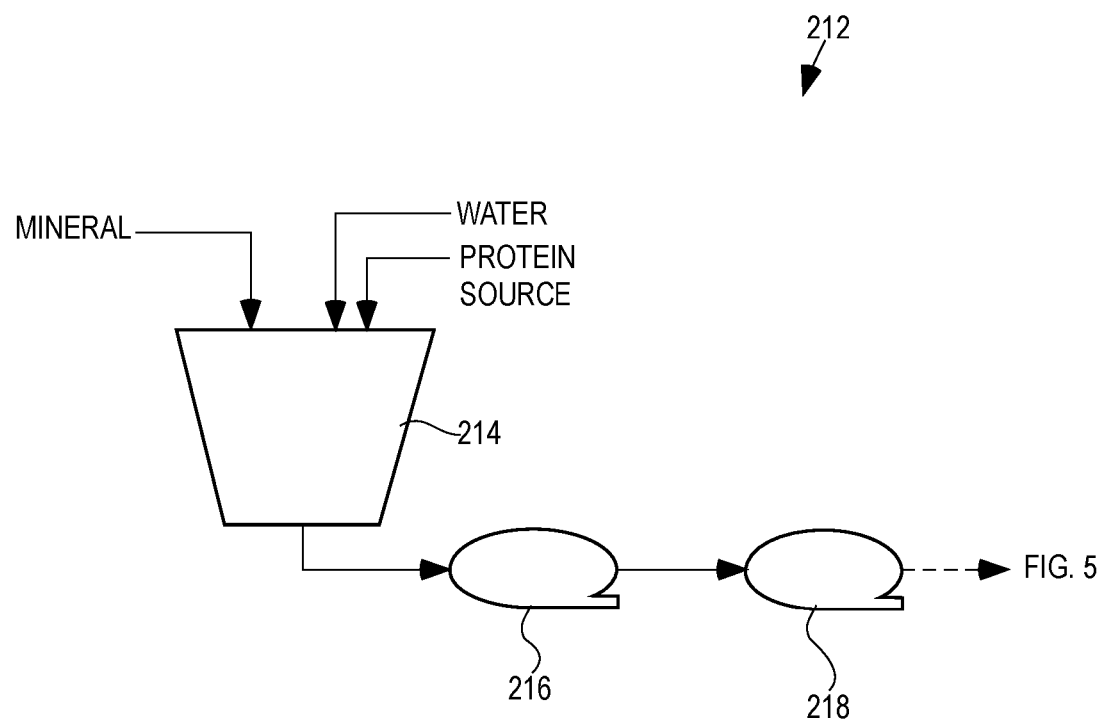
FIG. 3 is a block flow diagram of an exemplary process for separately hydrating the protein source for the production of a spoonable smoothie using thermal processing.

FIG. 3 shows a process 212 for separately hydrating the protein source. A whey protein isolate may be separately hydrated in a manner where foaming is minimized, such as a high shear mixing process under vacuum, for example, a Semi Bulk system 214. The remaining 25% of the water may be warmed and added to the Semi Bulk system 214. However, the water should not exceed 130° F. to prevent protein denaturation. In some methods, the water is between 110° F. and 130° F. or about 120° F. The whey protein isolate may be drawn into the solution through a commingle nozzle. Due to the high shear created by the circulation of water to incorporate the whey protein isolate, a vacuum may be needed during hydration to prevent foaming. Minerals, such as calcium citrate, may also be added and mixed in with the whey protein isolate at this step. A pump 216, such as a Likiwifier pump, and a shear pump 218 may help transfer the protein/mineral slurry between the mixer 214 and the batch tank/high shear mixer 206.

Any vitamins powdered forms which may be needed for the desired formulation may be mixed in with the remaining 50% of the sugar. This mixing may take place in a bag, a vat, a tank, or any other appropriate container.

Figure 4:
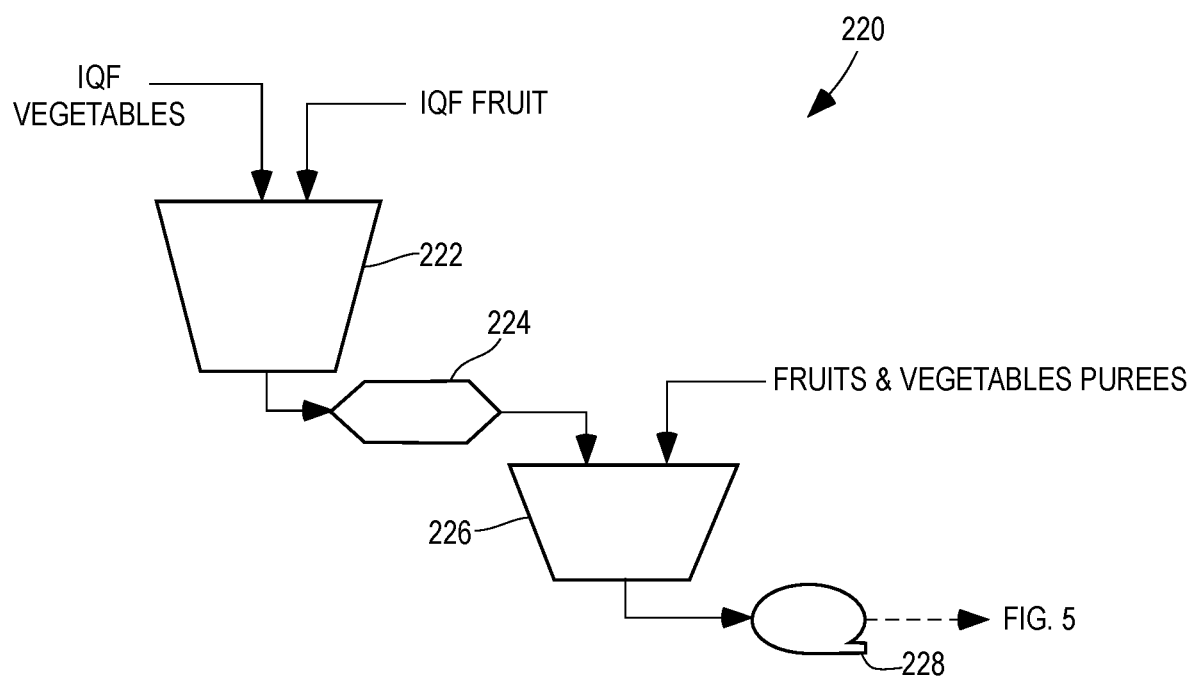
FIG. 4 is a block flow diagram of an exemplary process for preparing the fruits and vegetables sources for the production of a spoonable smoothie using thermal processing.

With respect to the fruit and vegetable sources, some formulations of the spoonable smoothie may require fruit or vegetable ingredients not available as purees. If any ingredients are individually quick frozen (IQF), then those IQF ingredients may be slacked out in refrigerated conditions and processed in a high shear chopping process to create a puree. FIG. 4 shows the process 220 for preparing the fruit and vegetable sources. The IQF fruits and vegetables may be added to a grinder hopper 222 before grinding in a grinder 224. The grinded IQF fruits and vegetables may be combined with fruit and vegetable purees in a puree hopper 226. The resulting fruit and vegetable mix may be directly added to the batch tank/high shear mixer 206 via pump 228.

Figure 5:
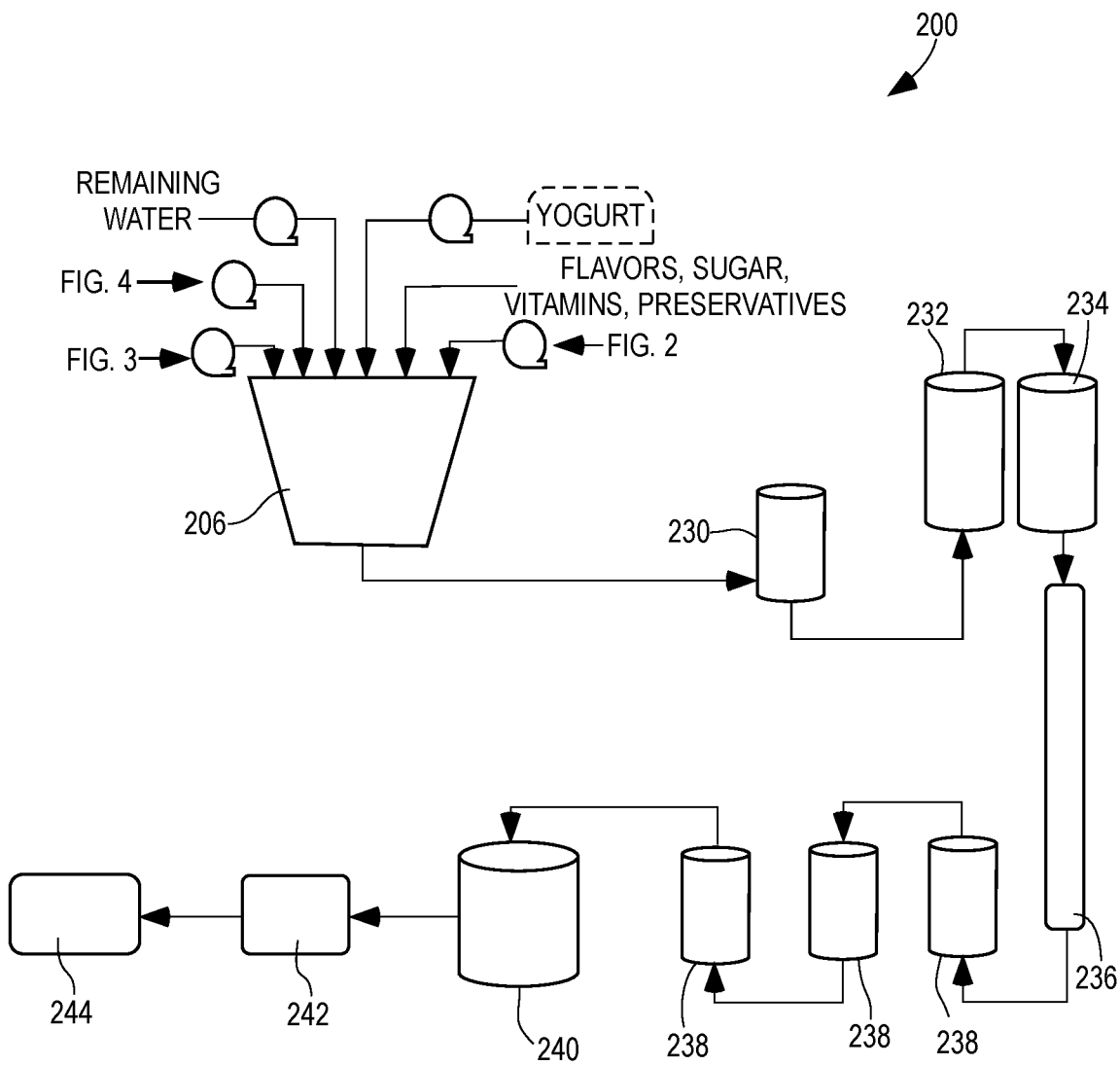
FIG. 5 is a block flow diagram of an exemplary process for the production of a spoonable smoothie using thermal processing.

Referring to FIG. 5, all fruit and vegetable purees, any other fruit and vegetable sources, and any desired yogurt may be added to the batch tank/high shear mixer 206 to blend with the texturant/sugar slurry. Flavor may then be added to the batch tank/high shear mixer 206. The sugar and vitamin combination may then be added to the batch tank/high shear mixer 206. The color may be added after or before the vitamin/sugar combination or the flavor. Lastly, the protein/mineral slurry may be added to the batch tank/high shear mixer 206 to help prevent denaturation of the protein. After a possible recirculation to help prevent the texturants from clogging the system, the final mixture may be emptied from the batch tank/high shear mixer 206.

The final mixture may be pumped to a balance tank 230, then directly to two scraped surface heat exchangers 232, 234. The first heat exchanger 232 may preheat the final mixture to approximately 140° F. The second heat exchanger 234 may heat the final mixture to between 172° F. and 175° F. The final mixture may then enter a hold tube 236 designed to provide a minimum of 170° F. throughout hold for a minimum of about 30 seconds. The flow rate of the final mixture may be approximately 10 to 12 gallons per minute. From the hold tube, the final mixture may enter a series of three double-walled scraped surface heat exchangers 238, which may reduce the final mixture to a temperature between 50° F. and 60° F. after the third heat exchanger. The final mixture may be maintained at a temperature below about 75° F. to maintain a desired quality. In some methods, the final mixture is cooled to between 30° F. and 45° F., between 35° F. and 40° F., or about 42° F. The final mixture may proceed to a holding tank 240, filling/sealing machinery 242, and then packaging 244.

The mouth texture and spoonability of the spoonable smoothie may be quantified by analyses of the viscosity of the embodiments disclosed herein. The zero shear viscosity, representative of mouth texture, is related to the internal structure of the sample and is independent of applied strain. Yield stress, the minimum stress required for the material to start flowing, is estimated as the product of zero shear viscosity and critical shear rate, where critical shear rate is the minimum shear rate at which the material starts shear thinning. Yield stress is representative of the spoonability of the sample.

Samples of the spoonable smoothies were analyzed by a Discovery Hybrid Rheometer DHR-3 (TA Instruments located in New Castle, Del.). A flow ramp test was executed to determine viscosity, as a measured function of shear rate between 0.001 (1/s) and 1,000 (1/s) at a constant temperature of 5° C. Total ramp time was 900 s with data collected at 30 points per decade. Viscosity was tested for embodiments produced using HPP and for embodiments produced using thermal processing.

Four of the samples analyzed were produced by HPP (shown in Table 2). Sample 1 is a control sample produced with whey protein isolate as the protein source and locust bean gum as a texturant. Sample 2 is a sample produced with acid whey as the protein source and locust bean gum as a texturant. Sample 3 is a sample produced with whey protein isolate as the protein source and iota carageenan as a texturant. Sample 4 is a sample produced with whey protein isolate as the protein source and locust bean gum as a texturant, except that the dairy source is a homogenized yogurt. Seven of the samples were produced by thermal processing (shown in Tables 3). In all samples, the base includes the fruit and vegetable sources and, if any, flavors, colors, vitamins, and minerals.

TABLE 2

Samples produced via high-pressure processing method

| | Amount (%) | | | |
|---|---|---|---|---|
| Ingredient | Sample 1 | Sample 2 | Sample 3 | Sample 4 |
| Base | 44.52 | 46.20 | 43.32 | 44.82 |
| Dairy Component | 19 | 19 | 19 | 19 |
| Protein Source | 1.18 | 13.5 | 1.18 | 1.18 |
| Texturants | 1.30 | 1.30 | 2.5 | 1.0 |
| Sugar | 3.0 | 3.0 | 3.0 | 3.0 |
| Water | 31 | 17 | 31 | 31 |

TABLE 3

Samples produced via thermal processing method

| | Amount (%) | | | | | | |
|---|---|---|---|---|---|---|---|
| Ingredient | Sample 5 | Sample 6 | Sample 7 | Sample 8 | Sample 9 | Sample 10 | Sample 11 |
| Base | 41.455 | 46.862 | 42.991 | 45.922 | 43.322 | 42.315 | 42.345 |
| Dairy Component | 19 | 19 | 19 | 19 | 19 | 19 | 19 |

TABLE 3-continued

Samples produced via thermal processing method

| Ingredient | Amount (%) | | | | | | |
|---|---|---|---|---|---|---|---|
| | Sample 5 | Sample 6 | Sample 7 | Sample 8 | Sample 9 | Sample 10 | Sample 11 |
| Protein Source | 1.18 | 1.18 | 1.18 | 1.18 | 1.18 | 1.18 | 1.18 |
| Texturants | 2.905 | 2.925 | 3.025 | 3.050 | 3.050 | 2.900 | 3.050 |
| Sugar | 7.0 | 6.70 | 7.00 | 6.70 | 2.720 | 2.800 | 4.950 |
| Water | 28.46 | 23.333 | 26.84 | 24.148 | 30.728 | 31.805 | 29.475 |

Figure 6:
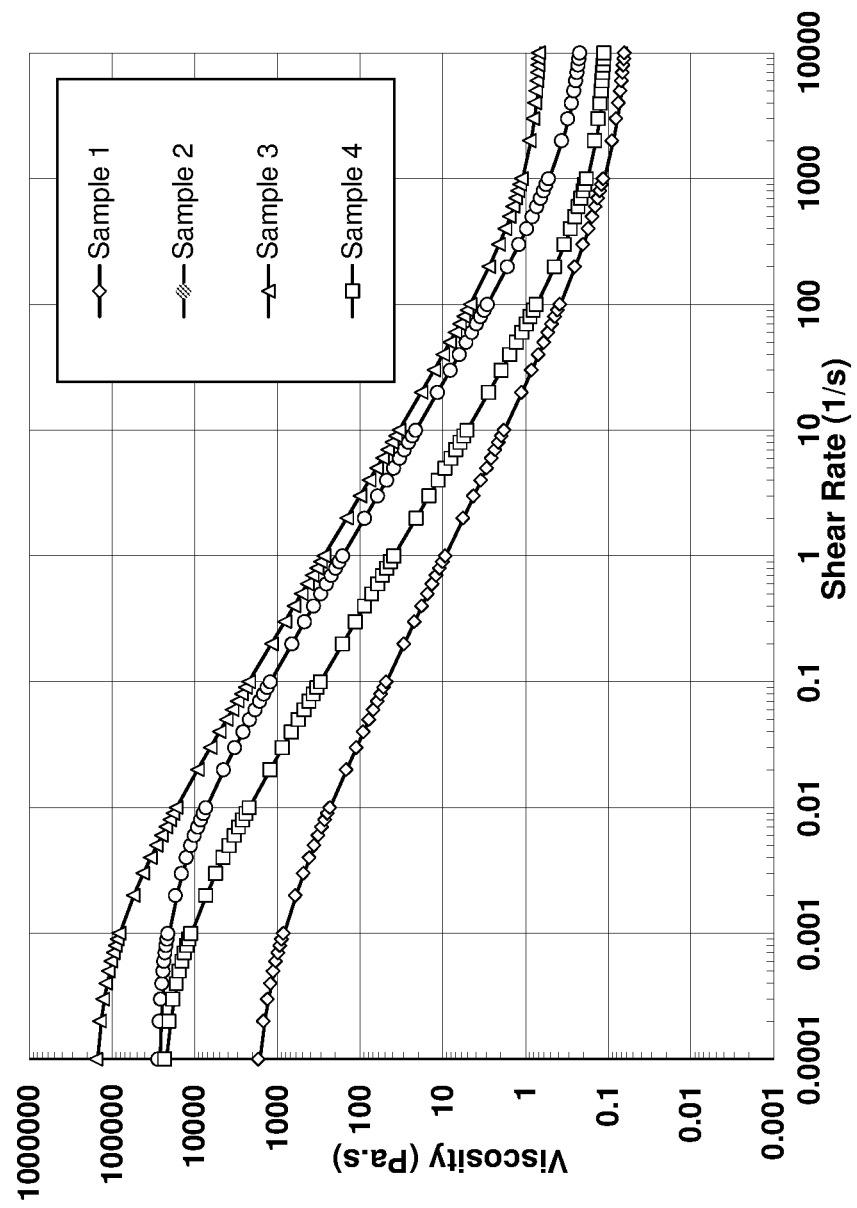
FIG. 6 is a graph showing the flows curves (viscosity as a function of shear rate) for four samples of a spoonable smoothie (i.e., a spoonable smoothie with: 1) whey protein isolate; 2) acid whey in place of whey protein isolate; 3) iota carrageenan added; and 4) homogenized yogurt) produced using high-pressure processing.
Figure 7:
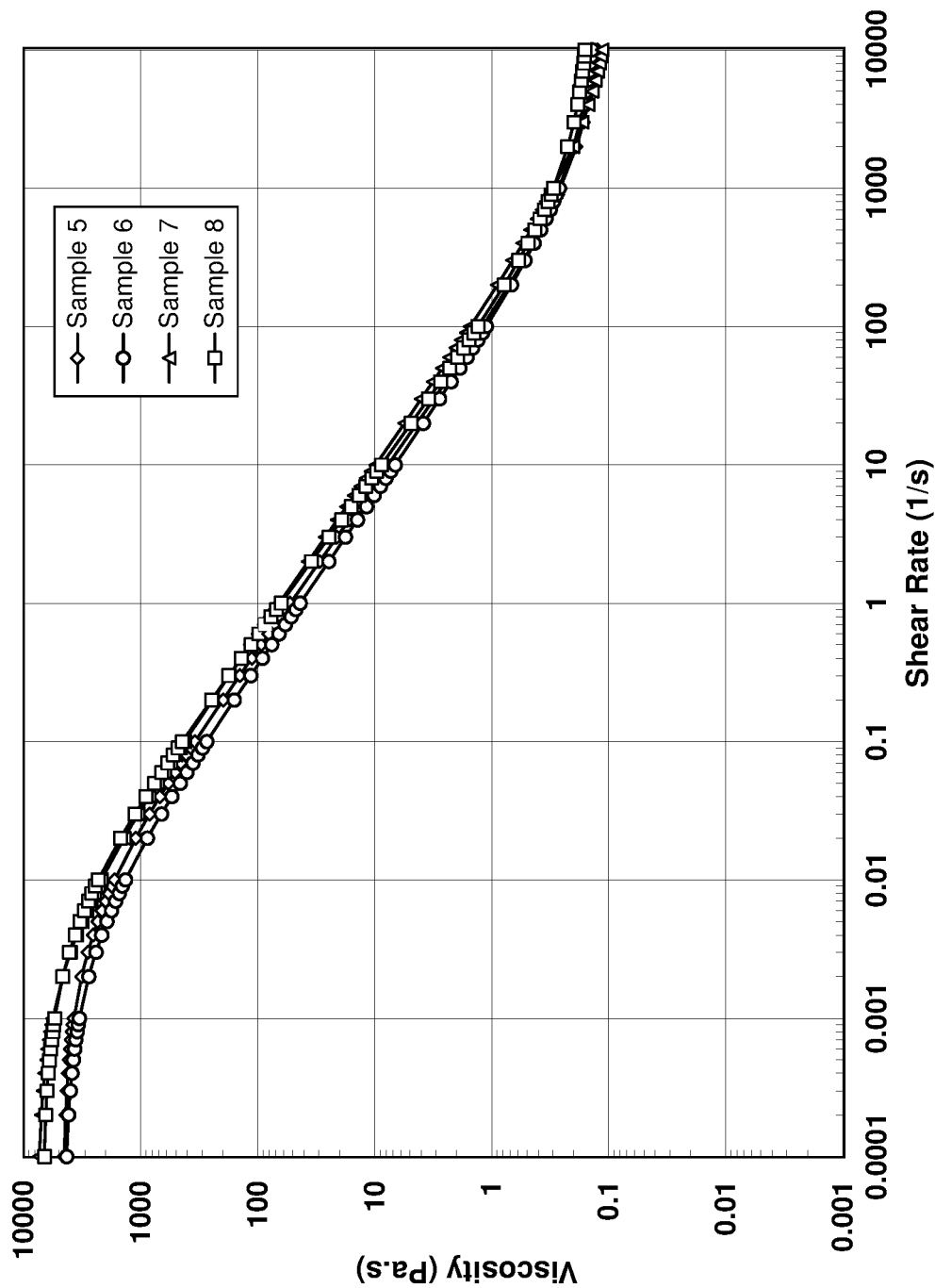
FIG. 7 is a graph showing the flows curves (viscosity as a function of shear rate) for four samples of a spoonable smoothie produced using thermal processing.
Figure 8:
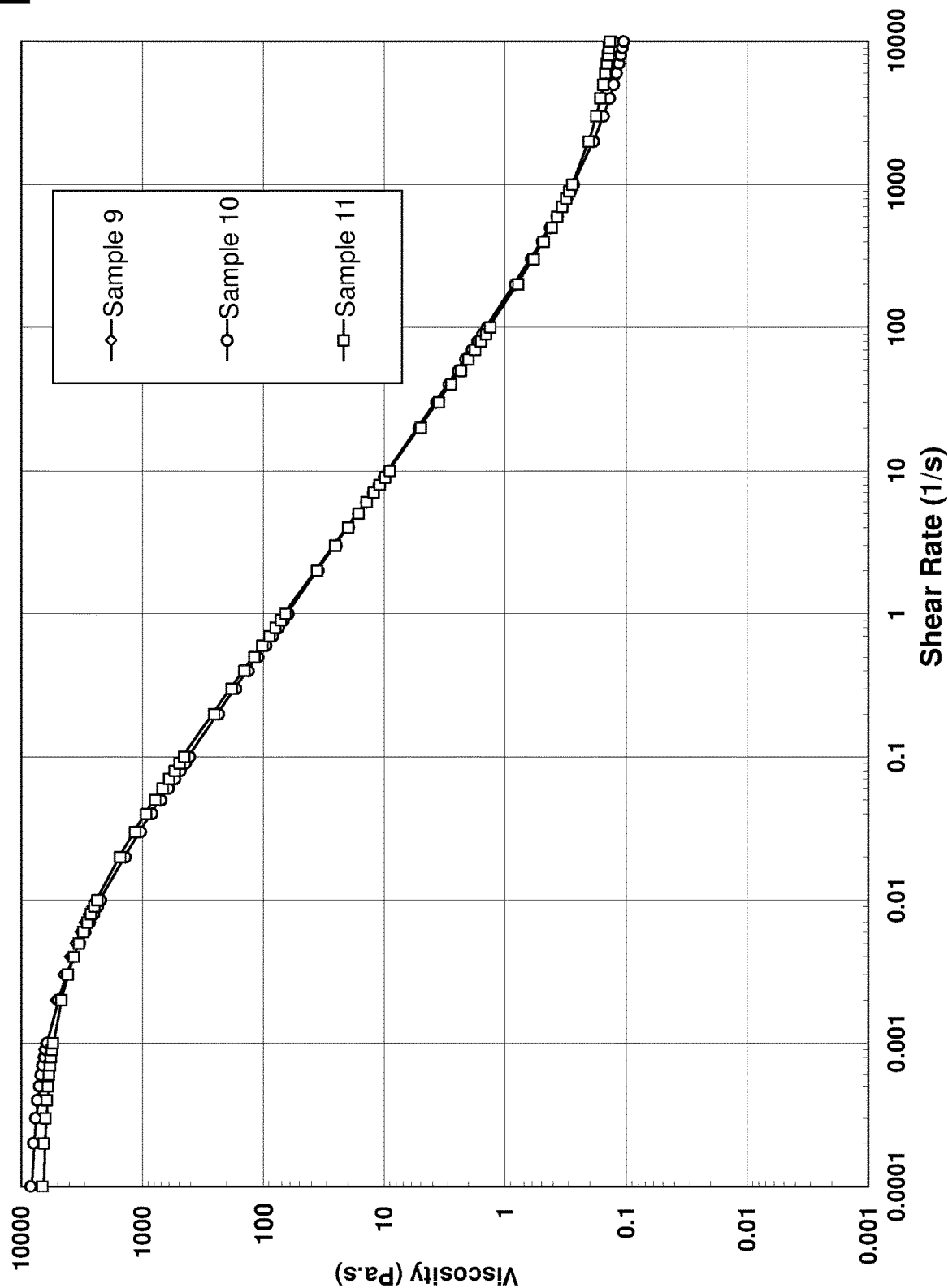
FIG. 8 is a graph showing the flows curves (viscosity as a function of shear rate) for another three samples of a spoonable smoothie produced using thermal processing.

FIG. 6 is the graph data generated when the rheometer analyzed the viscosity of the four samples in Table 2 as a function of shear rate at a constant temperature. FIG. 7 is the graph of data generated when the rheometer analyzed the viscosity of Samples 5-8 in Table 3 as a function of shear rate at a constant temperature. FIG. 8 is the graph of data generated when the rheometer analyzed the viscosity of Samples 9-11 in Table 3 as a function of shear rate at a constant temperature.

The data from the analyses and resulting graphs were fit to the Williamsons Model:

$$\eta = \frac{\eta_0}{1 + (c\dot{\gamma})^{1-\eta}}$$

where, $\eta$=viscosity at a shear rate of $\dot{\gamma}$; $\eta_0$=zero shear viscosity; c=rate constant (the inverse of the rate constant will give the critical shear rate where the material will begin shear thinning); n=flow index (n will vary between 0 and 1); and K=consistency; it is the viscosity at a shear rate of 1.0 (1/s) and can be estimated using the CROSS model as $$\eta = \frac{\eta_0}{1 + (c)^{1-n}}.$$

The Williamsons Model calculated the zero shear viscosity (representing mouth texture) and critical shear rate, from which yield stress (representing spoonability) was calculated. As shown below in Table 4, Samples 2-11 had improved mouth texture (greater zero shear viscosity) and spoonability (greater yield stress) than the control (Sample 1). In some embodiments, the zero shear viscosity may be at least 4,500 Pa·s; at least 4,600 Pa·s; at least 4,700 Pa·s; at least 4,800 Pa·s; at least 4,900 Pa·s; at least 5,000 Pa·s; at least 5,500 Pa·s; at least 6,000 Pa·s; at least 6,500 Pa·s; at least 7,000 Pa·s; at least 7,500 Pa·s; at least 8,000 Pa·s; at least 8,500 Pa·s; at least 9000 Pa·s; at least 10,000 Pa·s; at least 15,000 Pa·s; at least 20,000 Pa·s or between about 4,500 Pa·s and 98,000 Pa·s. In some embodiments, the yield stress may be at least 10 Pa, at least 15 Pa, at least 20 Pa, at least 25 Pa, at least 30 Pa, at least 35 Pa, at least 40 Pa, at least 50 Pa, at least 100 Pa, at least 200 Pa, at least 300 Pa, at least 400 Pa, at least 500 Pa, at least 1,000 Pa, at least 1,500 Pa, or between about 15 Pa and about 1,620 Pa.

TABLE 4

| Sample | Zero Shear Viscosity (Pa · s) | Infinite Shear Viscosity (Pa) | Critical Shear Rate (1/s) | Flow Index | Yield Stress (Pa) |
|---|---|---|---|---|---|
| 1 | 1281 | 0.0691 | 0.0020 | 0.22 | 3 |
| 2 | 17628 | 0.0941 | 0.0007 | 0.14 | 1612 |

TABLE 4-continued

| Sample | Zero Shear Viscosity (Pa · s) | Infinite Shear Viscosity (Pa) | Critical Shear Rate (1/s) | Flow Index | Yield Stress (Pa) |
|---|---|---|---|---|---|
| 3 | 97223 | 0.6385 | 0.0036 | 0.00 | 349 |
| 4 | 26797 | 0.1024 | 0.0010 | 0.02 | 28 |
| 5 | 4675 | 0.1024 | 0.0050 | 0.16 | 23 |
| 6 | 4531 | 0.1162 | 0.0035 | 0.18 | 16 |
| 7 | 7794 | 0.0826 | 0.0032 | 0.17 | 25 |
| 8 | 6928 | 0.1372 | 0.0045 | 0.13 | 31 |
| 9 | 8447 | 0.0983 | 0.0035 | 0.14 | 29 |
| 10 | 8853 | 0.0770 | 0.0027 | 0.16 | 24 |
| 11 | 6913 | 0.1147 | 0.0047 | 0.13 | 32 |

The firmness of the spoonable smoothie may be measured in a frequency sweep test which represents the gel strength of the embodiments disclosed herein. Samples of the spoonable smoothies were analyzed by a Discovery Hybrid Rheometer DHR-3 (TA Instruments located in New Castle, Del.). A frequency sweep test was executed to determine the linear viscoelastic properties of the material, as a measured function of frequency at a test temperature of 5° C. The test geometry was a 40 mm cross hatched parallel plate with 60 mm cross hatched bottom plate with a geometry gap of 2 mm. Firmness was measured for Samples 1-11 produced using HPP or thermal processing.

Figure 9:
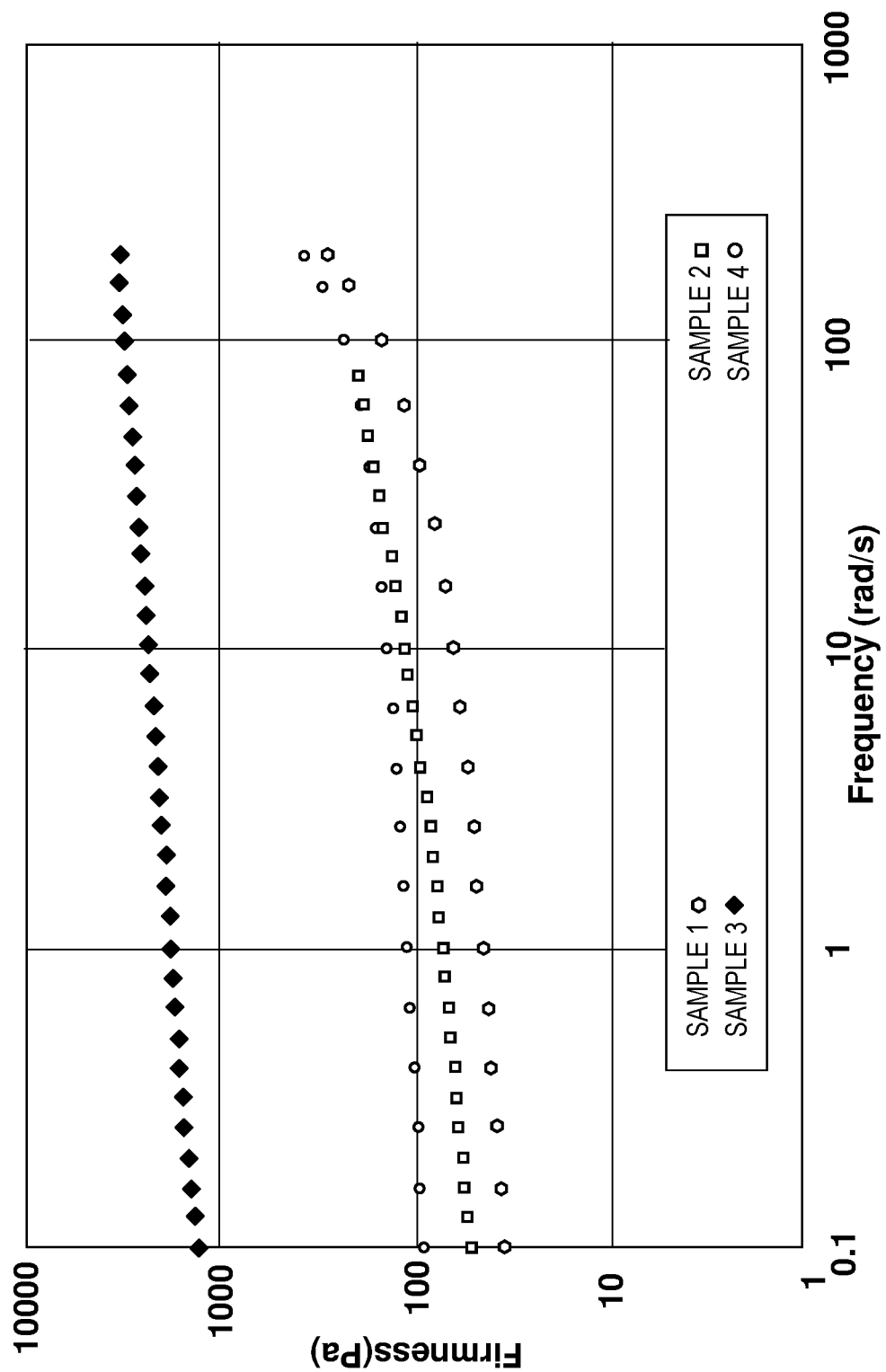
FIG. 9 is a graph showing frequency sweep test results for four samples of a spoonable smoothie (i.e., a spoonable smoothie with: 1) whey protein isolate; 2) acid whey replacing whey protein isolate; 3) iota carrageenan added; and 4) homogenized yogurt) produced using high-pressure processing.
Figure 10:
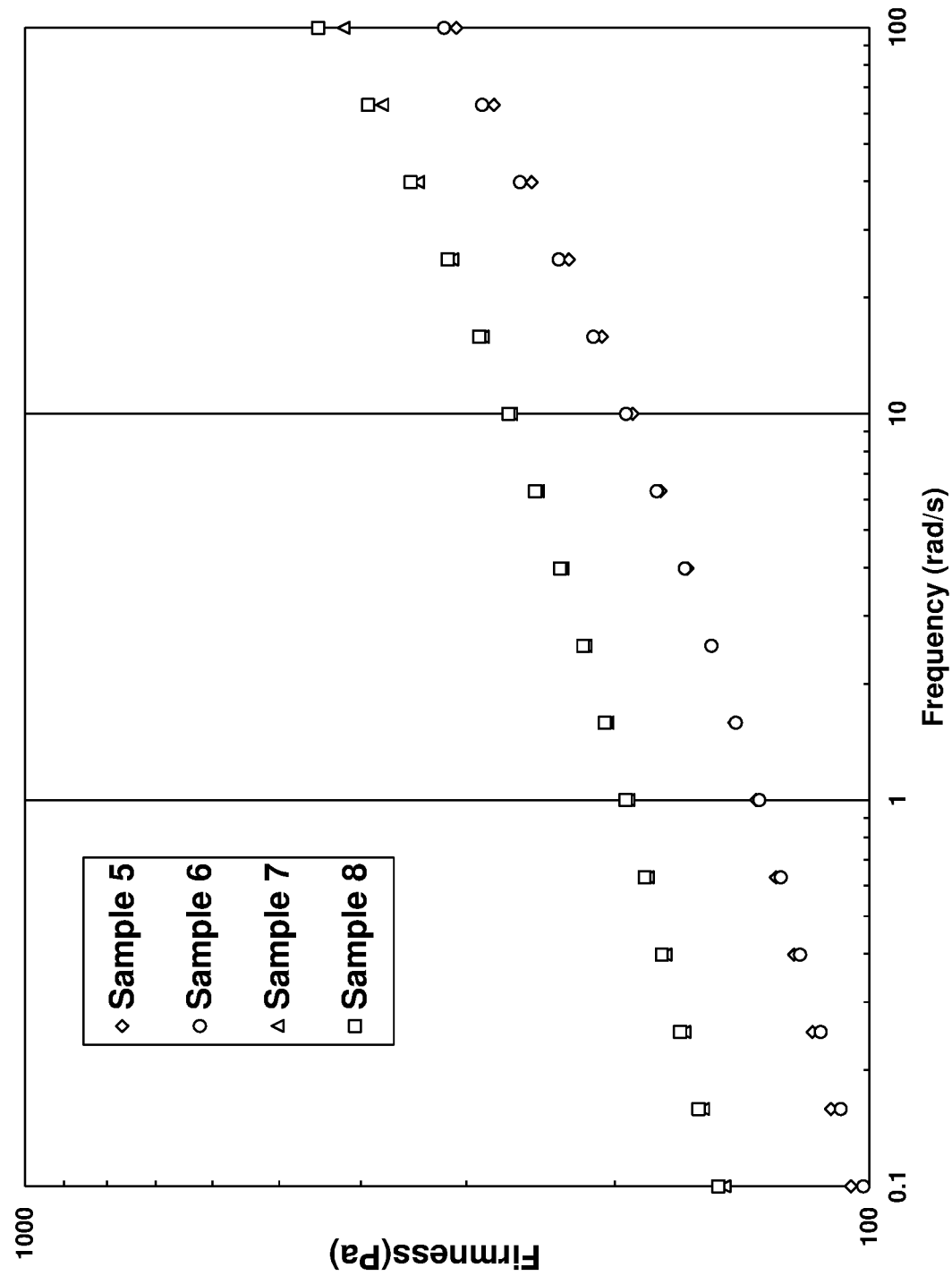
FIG. 10 is a graph showing frequency sweep test results for four samples of a spoonable smoothie produced using thermal processing.
Figure 11:
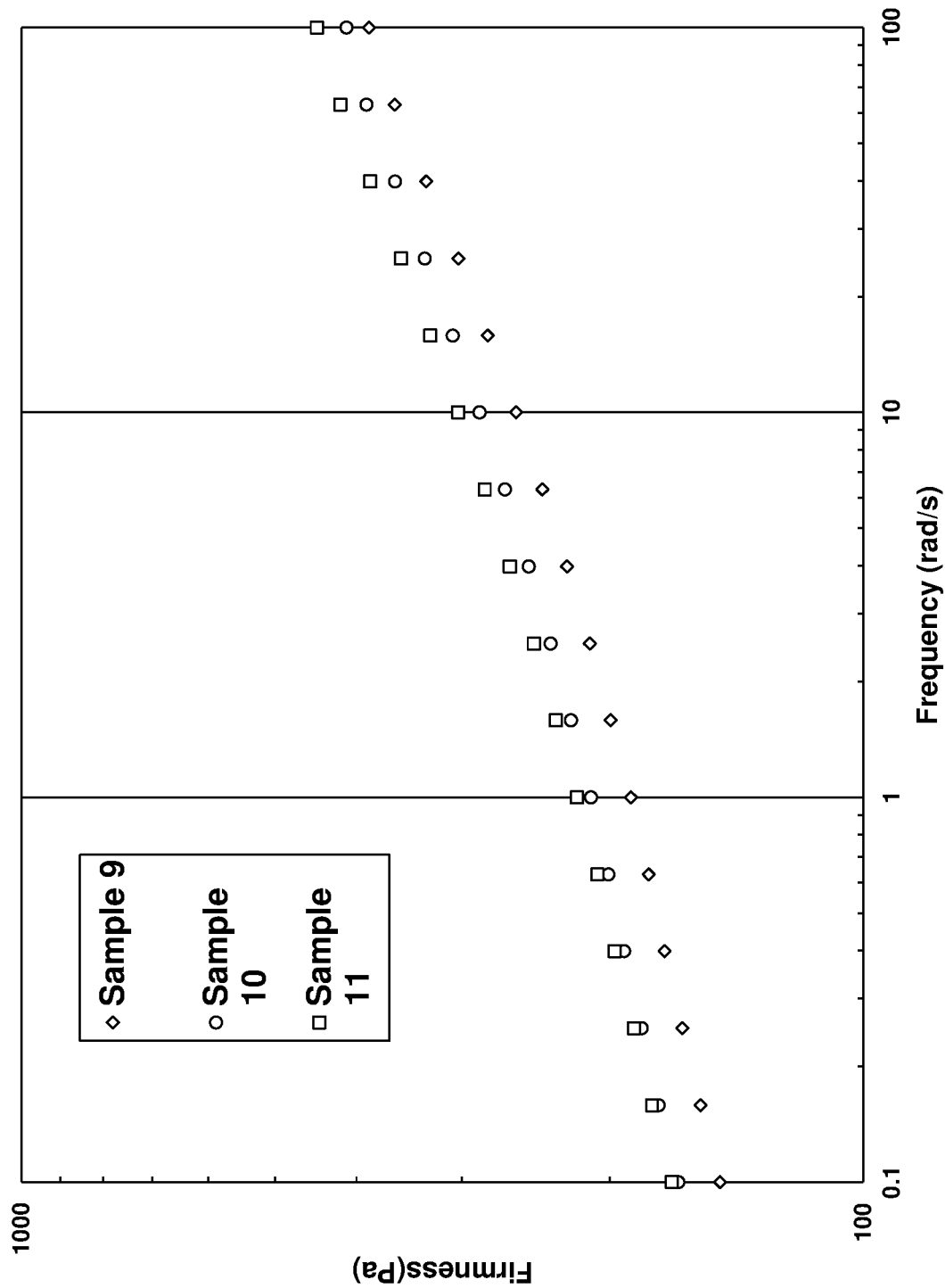
FIG. 11 is a graph showing frequency sweep test results for another three samples of a spoonable smoothie produced using thermal processing.

FIG. 9 is the graph of data generated when the rheometer analyzed the firmness of Samples 1-4 as a function of frequency at a constant temperature. FIG. 10 is the graph of data generated when the rheometer analyzed the firmness of Samples 5-8 as a function of frequency at a constant temperature. FIG. 11 is the graph of the data generated when the rheometer analyzed the firmness of Samples 9-11 as a function of frequency at a constant temperature.

G1 is the firmness of a sample at the frequency of 1 rad/s. Complex viscosity is viscosity during forced harmonic oscillation of shear stress (i.e., how viscous the sample remains when both stress and strain vary harmonically with time). Relaxation time may be indicative of network structure of a material. Samples with stronger network structures will have longer relaxation times. As shown below in Table 5, Samples 2-11 had improved firmness (greater G1) and stronger network structures (longer relaxation times), except Sample 2, than the control (Sample 1). In some embodiments, the firmness may be at least 70 Pa, at least 100 Pa, at least 110 Pa, at least 120 Pa, at least 130 Pa, at least 140 Pa, at least 150 Pa, at least 160 Pa, at least 170 Pa, at least 180 Pa, at least 190 Pa, at least 200 Pa, at least 210 Pa, at least 220 Pa, at least 500 Pa, at least 1,000 Pa, at least 1,500 Pa, or between about 115 Pa and about 1,790 Pa.

TABLE 5

| Sample | G1 (Pa) Firmness | Complex Viscosity CV1 (Pa) | Relaxation Time |
|---|---|---|---|
| 1 | 47.830 | 45.176 | 2.876 |
| 2 | 77.272 | 72.601 | 2.744 |
| 3 | 1786.988 | 1749.067 | 4.776 |
| 4 | 115.488 | 111.573 | 3.742 |
| 5 | 140.074 | 136.193 | 4.159 |
| 6 | 138.965 | 134.468 | 3.834 |
| 7 | 197.341 | 192.167 | 4.281 |
| 8 | 199.504 | 194.442 | 4.354 |
| 9 | 193.837 | 189.117 | 4.448 |
| 10 | 215.787 | 210.660 | 4.505 |
| 11 | 223.807 | 217.984 | 4.298 |

Yet another challenge to producing a smoothie with a fibrous, non-gritty, spoonable texture may occur when the mixture is fortified with minerals and vitamins, or a combination thereof. Specifically, the addition of riboflavin as a source of Vitamin B2 may add (or intensify) an orange color. In some embodiments, thiamine hydrochloride may be used instead of riboflavin, which may help prevent any undesirable orange coloring. In some embodiments, addition of calcium carbonate as a source of the mineral, calcium, may cause unwanted precipitation in the spoonable smoothie, which may result in an undesirable texture. In some embodiments, calcium citrate may replace calcium carbonate, and may help provide a more desirable texture. The calcium citrate may be added with sugar later in the process rather than with the whey protein isolate when the whey protein isolate is hydrated.

In some embodiments, there is provided a spoonable smoothie product that is entirely or almost entirely natural (with minimal or no artificial ingredients, preservatives, colors, or flavors) with a refrigerated shelf life of at least 15 days, at least 30 days, at least 45 days, or between about 142 days. In some embodiments, the product may have a longer refrigerated shelf life, e.g., 60 days, 75 days, 90 days, or 142 days. In some embodiments, the product may be packaged in a polymeric cup made of polypropylene, PET, or other food grade materials, with a peelable foil lid.

In some embodiments, the cup may be entirely or partly transparent or translucent. This may result in the smoothie composition being exposed to light during its shelf life. Ideally, in addition to having microbial stability for its entire shelf life, the product will also have flavor and color stability as well as nutritional stability for its entire shelf life, when exposed to light typically associated with retail display, e.g., light intensity typically associated with a refrigerated display case in a supermarket. In some embodiments, the smoothie will have a color, texture and flavor comparable to those of a freshly made smoothie made from fresh fruit and other fresh ingredients, including a fibrous texture obtained by use of a blender, wherein bits of pulp and/or other solids, seeds, or fibrous materials contribute to a desirable mouth-feel. In some embodiments, the bits of pulp and/or other solids, seeds, or fibrous materials may not be larger than the width of a drinking straw such that they may be drinkable through a straw. In some embodiments, the smoothie may leave little to no mouth coating after it is consumed. In some embodiments, the spoonable smoothie may have a vibrant color. In some embodiments, the pH of the spoonable smoothie may be 3.6 to 4.3, and preferably 3.6 to 4.0.

The spoonable smoothie may be self-supporting, so that a spoonful of the smoothie composition in any particular spoon may, if desired, have a volume greater than a spoonful of liquid in the same spoon, while still being flowable. Particularly, the smoothie may have a viscosity between about 10,000 Pa·s to about 30,000 Pa·s, or between about 15,000 Pa·s and 17,000 Pa·s at refrigerated temperatures. All viscosities refer to zero shear viscosity measured using the rheometer by TA Instruments. In some embodiments, the viscosity and the texture may be somewhere between that of a full-fat dairy yogurt and of a high-protein Greek yogurt.

CONCLUSION

Each of the various features described above may be used in combination with any other compatible features described above, or with features not described herein. Various aspects of the products and processes described herein are further described in the following claims. Unless otherwise noted, all percentages are percentages by weight.

What is claimed is:

1. A method of producing a spoonable smoothie comprising:
   preparing a hot mix, wherein the hot mix includes a pectin, a sugar, and an amount of hot water;
   preparing a first cold mix, wherein the first cold mix includes a fruit source, a vegetable source, and a yogurt;
   preparing a second cold mix, wherein the second cold mix includes a whey protein source and an amount of cold water;
   cold mixing and shearing together the hot mix, the first cold mix, and the second cold mix to form a final mixture;
   packing the final mixture into a package; and
   submitting the package to high-pressure processing.

2. The method of claim 1, wherein the whey protein source comprises acid whey.

3. The method of claim 1, wherein the yogurt is homogenized yogurt.

4. The method of claim 1, further comprising adding iota carrageenan gum to the hot mix.

* * * * *